US008355866B2

(12) United States Patent  (10) Patent No.: US 8,355,866 B2
Smith et al.  (45) Date of Patent: Jan. 15, 2013

(54) TRIPLY REDUNDANT INTEGRATED NAVIGATION AND ASSET VISIBILITY SYSTEM

(75) Inventors: Stephen F. Smith, Loudon, TN (US); James A. Moore, Powell, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/272,973

(22) Filed: Oct. 13, 2011

(65) Prior Publication Data

US 2012/0029818 A1    Feb. 2, 2012

Related U.S. Application Data

(62) Division of application No. 11/583,373, filed on Oct. 17, 2006, now Pat. No. 8,068,984.

(51) Int. Cl.
 *G01C 21/00* (2006.01)
(52) U.S. Cl. ... 701/468; 342/450; 342/386; 342/357.31; 375/295; 375/316
(58) Field of Classification Search .................. 701/468; 342/450, 350, 464, 453, 386, 357.31; 375/150, 375/147, 295, 316
See application file for complete search history.

(56) References Cited

U.S. PATENT DOCUMENTS

| 3,372,395 | A |   | 3/1968  | Kline |
|-----------|---|---|---------|-------|
| 5,146,231 | A |   | 9/1992  | Ghaem et al. |
| 5,212,715 | A | * | 5/1993  | Pickert et al. ............... 375/366 |
| 5,245,634 | A | * | 9/1993  | Averbuch ..................... 375/357 |
| 5,323,322 | A | * | 6/1994  | Mueller et al. .............. 701/471 |
| 5,402,348 | A |   | 3/1995  | De La Salle et al. |
| 5,668,775 | A |   | 9/1997  | Hatteland |
| 5,796,366 | A |   | 8/1998  | Grebnev et al. |
| 5,982,324 | A |   | 11/1999 | Watters et al. |
| 6,075,987 | A |   | 6/2000  | Camp et al. |
| 6,252,543 | B1 |  | 6/2001  | Camp |
| 6,285,316 | B1 |  | 9/2001  | Nir et al. |
| 6,308,077 | B1 |  | 10/2001 | Walsh |
| 6,424,297 | B2 |  | 7/2002  | Tamura et al. |
| 6,466,200 | B1 |  | 10/2002 | Anton et al. |
| 6,539,306 | B2 |  | 3/2003  | Turnbull |

(Continued)

FOREIGN PATENT DOCUMENTS

JP    55114970 A    *   9/1980

(Continued)

OTHER PUBLICATIONS

Abbott, E. et al.; "Land-vehicle Navigation Using GPS"; Proceedings of the IEEE; vol. 87(1), pp. 145-162; Jan. 1999.

(Continued)

*Primary Examiner* — Tuan C. To
(74) *Attorney, Agent, or Firm* — Brinks Hofer Gilson & Lione

(57) ABSTRACT

Methods and apparatus are described for a navigation system. A method includes providing a global positioning system fix having a plurality of tracking parameters; providing a theater positioning system fix; monitoring the plurality of tracking parameters for predetermined conditions; and, when the predetermined conditions are met, sending a notifying signal and switching to the theater positioning system fix as a primary fix. An apparatus includes a system controller; a global positioning system receiver coupled to the system controller; a radio frequency locating receiver coupled to the system controller; and an operator interface coupled to the system controller.

17 Claims, 18 Drawing Sheets

U.S. PATENT DOCUMENTS

| | | | | |
|---|---|---|---|---|
| 6,556,942 B1 * | 4/2003 | Smith | ............ | 702/150 |
| 6,567,389 B1 * | 5/2003 | Honkasalo et al. | ........... | 370/342 |
| 6,603,818 B1 * | 8/2003 | Dress et al. | ............ | 375/295 |
| 6,693,511 B1 * | 2/2004 | Seal | ............ | 340/10.1 |
| 6,768,909 B1 | 7/2004 | Irvin | | |
| 6,925,135 B2 | 8/2005 | Smith et al. | | |
| 6,931,135 B1 * | 8/2005 | Kohut | ............ | 381/55 |
| 6,972,719 B1 | 12/2005 | Swope et al. | | |
| 6,973,145 B1 | 12/2005 | Smith et al. | | |
| 7,019,691 B1 * | 3/2006 | Soltanian et al. | ............ | 342/368 |
| 7,047,277 B1 * | 5/2006 | Welter et al. | ............ | 709/203 |
| 7,092,440 B1 | 8/2006 | Dress, Jr. et al. | | |
| 7,154,937 B2 * | 12/2006 | Gilmour et al. | ............ | 375/148 |
| 7,218,696 B2 * | 5/2007 | Smith et al. | ............ | 375/356 |
| 7,245,215 B2 | 7/2007 | Gollu et al. | | |
| 7,299,034 B2 | 11/2007 | Kates | | |
| 7,372,966 B2 * | 5/2008 | Bright | ............ | 381/55 |
| 7,394,381 B2 | 7/2008 | Hanson et al. | | |
| 7,411,492 B2 | 8/2008 | Greenberg | | |
| 7,468,694 B2 | 12/2008 | Shoarinejad | | |
| 7,479,927 B2 | 1/2009 | Scarpelli | | |
| 7,555,263 B1 * | 6/2009 | Rofougaran et al. | ............ | 455/20 |
| 7,636,061 B1 | 12/2009 | Thomas et al. | | |
| 7,840,352 B2 | 11/2010 | Strelow et al. | | |
| 8,036,164 B1 * | 10/2011 | Winters et al. | ............ | 370/329 |
| 8,131,300 B2 * | 3/2012 | Sartori et al. | ............ | 455/445 |
| 2002/0019698 A1 | 2/2002 | Vilppula et al. | | |
| 2002/0193946 A1 * | 12/2002 | Turnbull | ............ | 701/219 |
| 2003/0008669 A1 | 1/2003 | Stein et al. | | |
| 2003/0018430 A1 | 1/2003 | Ladetto et al. | | |
| 2003/0107514 A1 | 6/2003 | Syrjarinne et al. | | |
| 2003/0119568 A1 | 6/2003 | Menard | | |
| 2003/0122720 A1 | 7/2003 | Matz et al. | | |
| 2003/0144795 A1 | 7/2003 | Lin | | |
| 2003/0148761 A1 | 8/2003 | Gaal | | |
| 2004/0064252 A1 | 4/2004 | Kirkland et al. | | |
| 2004/0203853 A1 | 10/2004 | Sheynblat | | |
| 2004/0236500 A1 | 11/2004 | Choi et al. | | |
| 2005/0143916 A1 * | 6/2005 | Kim et al. | ............ | 701/214 |
| 2006/0069469 A1 | 3/2006 | Campbell et al. | | |
| 2006/0122775 A1 | 6/2006 | Soehren | | |
| 2006/0193373 A1 | 8/2006 | Agee et al. | | |
| 2006/0240839 A1 | 10/2006 | Chen et al. | | |
| 2006/0255934 A1 | 11/2006 | Easley et al. | | |
| 2006/0287816 A1 | 12/2006 | Bardsley et al. | | |
| 2007/0018811 A1 | 1/2007 | Gollu | | |
| 2007/0073481 A1 | 3/2007 | Morgan et al. | | |
| 2007/0211791 A1 | 9/2007 | Ganguly et al. | | |
| 2007/0241886 A1 | 10/2007 | Breeding | | |
| 2007/0286028 A1 * | 12/2007 | Meltzer et al. | ............ | 368/47 |
| 2008/0004796 A1 | 1/2008 | Schott et al. | | |
| 2008/0129591 A1 | 6/2008 | Lamance et al. | | |
| 2008/0140316 A1 | 6/2008 | Masson | | |

FOREIGN PATENT DOCUMENTS

| | | | |
|---|---|---|---|
| JP | 01036125 A | * | 2/1989 |
| JP | 10104015 A | | 4/1998 |

OTHER PUBLICATIONS

Peterson, B. et al.; "Integrated GPS/LORAN: Structures and Issues"; Proceedings of the 54th Annual Meeting of the Institute of Navigation; vol. 54, pp. 363-372; Jun. 1998.

Weston, J.L. et al.; "Modern Inertial Navigation Technology and Its Application"; Electronics & Communication engineering Journal; vol. 12:(2), pp. 49-64; Apr. 2000.

Navstar GPS Space Segment/Navigation User Interfaces; Navstar Global Positioning System, Interface Specification; IS-GPS-200; Revision D.; ARINC Engineering Services, LLC; Dec. 2004.

Lo, Sherman C. et al., "Broadcasting Data from an SBAS Reference Network over using LORAN," Stanford University, Department of Aeronautics and Astronautics, http://wasas.stanford.edu/~wwu/sherman/IONIAIN2000.pdf, pp. 1-10; 2000.

Buckner, Mark A.; "Learning from Data with Localized Regression and Differential Evolution"; Dissertation; The University of Tennessee, Knoxville; May 2003; pp. 1-183.

Dixon, Robert C.; "Spread Spectrum Systems with Commercial Applications"; John Wiley & Sons, Inc.; Third Edition; 1994; pp. 18-32, 85-112, and 500-503.

Dostert, K., "Frequency-Hopping Spread-Spectrum Modulation for Digital Communications over Electrical Power Lines," IEEE, vol. 8, No. 4, 1990, pp. 700-710.

Frost & Sullivan;Revolutionary New Navigation System Combines Multiple Technologies for Robustness, Reliability; Technical Insights; Oct. 28, 2005; p. 4.

Grewal, Mohinder S. et al.; "Global Positioning Systems, Inertial Navigation, and Integration"; John Wiley & Sons, Inc.; 2001; pp. 9-28.

Hutsell, Capt. S. T., "Relating the Hadamard Variance to MCS Kalman Filter Clock Estimation," 1995, pp. 291-301.

Kaplan, Elliott D., Editor; "Understanding GPS Principles and Applications"; Artech House Inc.; 1996; pp. 39-52 and 54.

Lo, Sherman C. et al., "Broadcasting Data from an SBAS Reference Network over using LORAN," Stanford University, Department of Aeronautics and Astronautics, http://wasas.stanford.edu/~wwu/sherman/IONIAIN2000.pdf pp. 1-10.

R. van der Merwe and E. Wan, Sigma-Point Kalman Filters for Probabilistic Inference in Dynamic State-Space Models, Proceedings of the Workshop on Advances in Machine Learning, Montreal, Canada, Jun. 2003; 27 pages.

Simon, Marvin K.; "Bandwidth-Efficient Digital Modulation with Application to Deep-Space Communications"; John Wiley & Sons, Inc.; 2003; pp. 125-185.

"Streaming SIMD Extensions—Inverse of 4×4"; Intel Corporation; Mar. 1999; pp. 1-10.

* cited by examiner

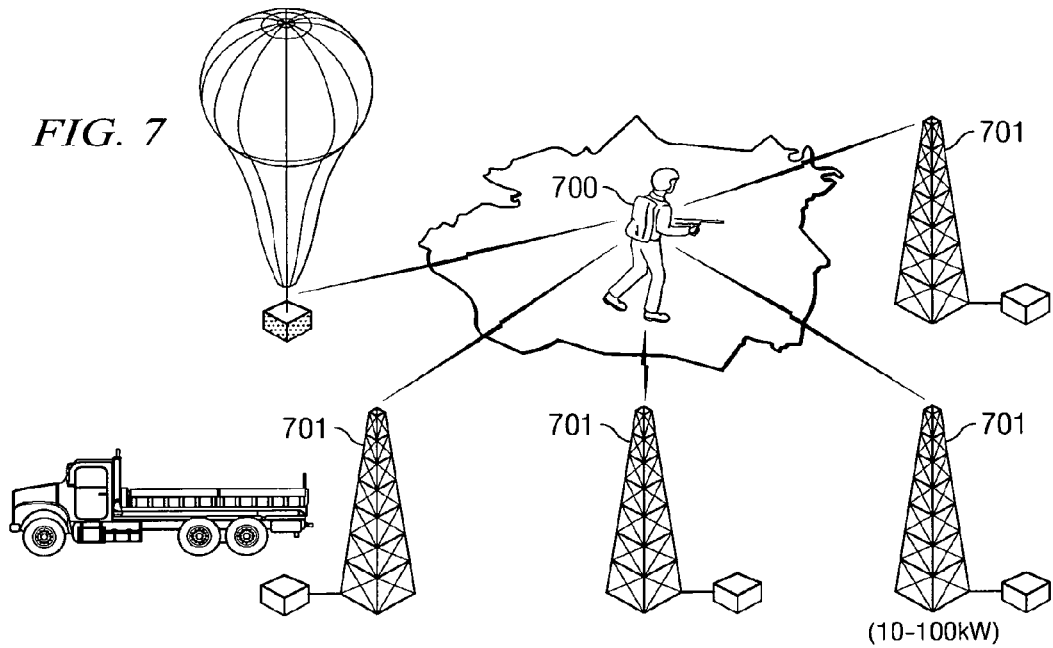
FIG. 7
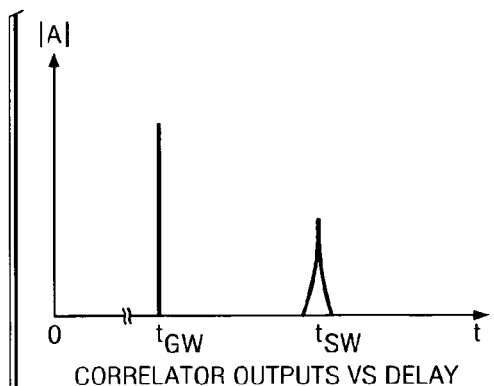
CORRELATOR OUTPUTS VS DELAY
FIG. 16
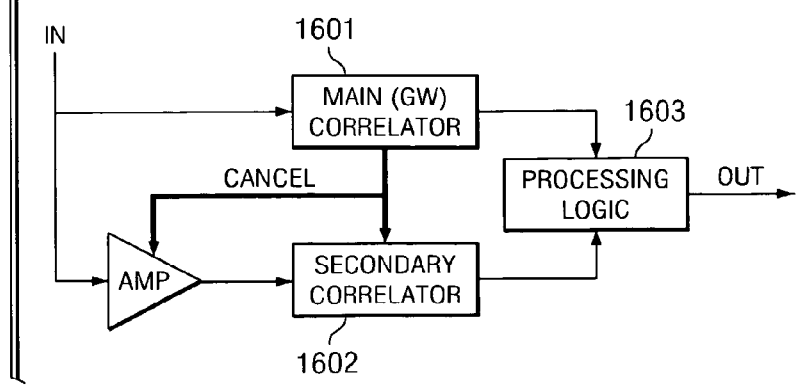

TRIPLY REDUNDANT INTEGRATED NAVIGATION AND ASSET VISIBILITY SYSTEM

PRIORITY CLAIM

This application is a divisional of U.S. patent application Ser. No. 11/583,373, filed Oct. 17, 2006 now U.S. Pat. No. 8,068,984, which is incorporated by reference.

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND INFORMATION

1. Field of the Invention

Embodiments of the invention relate generally to the field of communication systems. More particularly, an embodiment of the invention relates to navigation systems, and methods of performing navigation.

2. Discussion of the Related Art

Prior art navigation systems, such as the Global Positioning System (GPS), are known to those skilled in the art. For instance, a conventional global positioning system consists of more than two dozen GPS satellites broadcasting precise timing signals by radio to GPS receivers, allowing them to accurately determine their location (longitude, latitude, and altitude) anywhere on Earth.

A problem with this technology has been the lack of reliability in thick foliage, rough terrain, and urban areas. Therefore, what is required is a solution that provides navigation systems able to reliably function under such conditions.

Another problem with this technology has been the long time required to obtain a new fix, as well as susceptibility to multipath effects, jamming, or spoofing signals. Therefore, what is also required is a solution that provides a quicker and more robust fix, able to detect multipath, jamming or spoofing induced errors.

One unsatisfactory approach, in an attempt to solve the above-discussed problems involves the use of narrow correlator spacing to reduce noise and multipath effects. However, a disadvantage of this approach is that it does not substantially improve time-to-first-fix, nor does it improve reliability in areas where GPS signals cannot penetrate.

Heretofore, the requirements of reliable signals in difficult terrain, quick time-to-first-fix, and robustness of the fix referred to above have not been fully met. What is needed is a solution that simultaneously solves this all of these problems.

SUMMARY OF THE INVENTION

There is a need for the following embodiments of the invention. Of course, the invention is not limited to these embodiments.

According to an embodiment of the invention, a process comprises: providing a plurality of transmitters distributed throughout a desired coverage area; locking the plurality of transmitters to a common timing reference; transmitting a signal from each of the plurality of transmitters. According to another embodiment of the invention, a machine comprises: a plurality of transmitters distributed throughout a desired coverage area; wherein each of the plurality of transmitters comprises a packet generator; and wherein the plurality of transmitters are locked to a common timing reference. According to an embodiment of the invention, a process comprises: providing Global Positioning System fix having a plurality of tracking parameters; providing a Theater Positioning System fix; monitoring the plurality of tracking parameters for predetermined conditions; and, when the predetermined conditions are met, sending a notifying signal and switching to the Theater Positioning System fix as a primary fix. According to another embodiment of the invention, a machine comprises: a system controller; a Global Positioning System receiver coupled to the system controller; a radio frequency locating receiver coupled to the system controller; and an operator interface coupled to the system controller.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

FIG. 7 shows one basic configuration of a TPS scheme used by the invention.

FIG. 16 shows a 3-D TPS receiver block diagram. Basic receiver exploits CDMA nature of TPS signals via multiple correlators and spreading codes (1 each). 3-D TPS RX uses dual cross-coupled correlators per TX code (both ground and sky-wave components). GW correlation time delay is used to "window" the SW signal for better SIR. RX processor forces SW (X,Y) solution to match more stable GW values; then the rough Z coordinate is computed. TPS, much as GPS, can be greatly improved via use of differential locating techniques (1 or more receivers distributed around area of interest). Effective height of ionosphere (mostly E layer) varies from ~100 to 120 km for 100 kHz to about 5 MHz.

DESCRIPTION OF PREFERRED EMBODIMENTS

Figure 1:
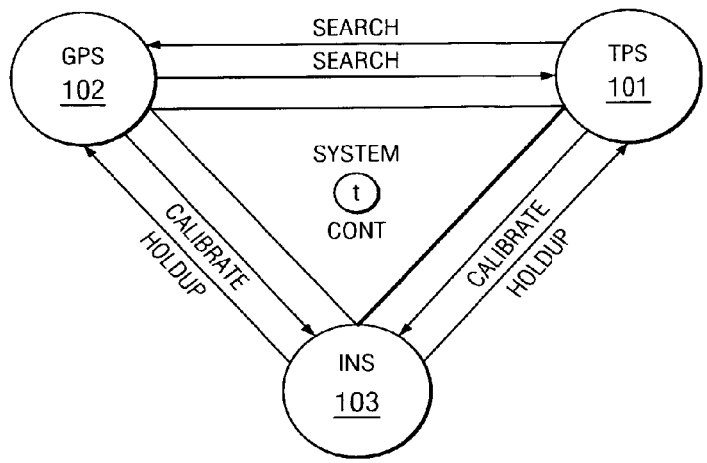
FIG. 1 shows a functional overview of one embodiment of the invention.

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals, or principal author's name followed by year of publication, within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

The below-referenced U.S. patent and U.S. patent application disclose embodiments that are useful for the purposes for which they are intended. The entire contents of U.S. Pat. No. 7,092,440, issued Aug. 15, 2006; U.S. Pat. No. 6,973,145, issued Dec. 6, 2005; U.S. Pat. No. 6,925,135, issued Aug. 2, 2005; and U.S. Pat. No. 6,556,942, issued Apr. 29, 2003, are hereby expressly incorporated by reference herein for all purposes. The entire contents of U.S. Ser. No. 10/840,092, filed May 6, 2004 are hereby expressly incorporated by reference herein for all purposes.

The invention can include a fault-tolerant, three-part [i.e., 3 navigation sources] personnel/asset location system combining a military-quality GPS unit, an advanced low-power Inertial Navigation System (Sensor+custom ORNL electronics), and a robust wide-area RF location scheme designated as the Theater Positioning System (TPS). Internal to the unit is a precision timing, processing, and control module to perform the integration of the position and time data from the 3 navigation subsystems (e.g., from space, terrestrial, and autonomous sources) and provide a composite display for the user. Additional functions of the control module are to assess signal quality and unit health, manage unit power, and to integrate additional, optional devices such as environmental sensors, electronic compass (for magnetic-north headings), inclinometer (to determine the local gravity vertical vector), barometer (to measure local atmospheric pressure and, thus, the inferred altitude). One very useful form of the TRINAV system incorporates a quartz oscillator array ("EQUATE" [described later]) which can both keep accurate time and measure both linear and rotational accelerations (and velocities) experienced by the TRINAV user unit and thus also serve as a medium-grade but very low-cost, low-power INS subsystem.

The principal version of the TPS makes use of a new spread-spectrum RF system transmitting in the same low-frequency (LF) range as the highly reliable and commercially proven LORAN-C (~80-120 kHz). In its initial configuration, TPS was implemented as a four-band spread signal, with two main components at the band edges (80-90 kHz and 110-120 kHz) to minimize their impact on existing LORAN signals, and two lower-power secondary components overlapping the principal 90-110 kHz region (where ≧99% of the LORAN power resides). Alternatively or additionally, other frequency bands (e.g., in the MF or HF regions) may also be utilized for smaller operational areas or where the size of typical 100-kHz transmitting antennas is undesirable. A currently deployed version of TPS for the Army uses a single spread-spectrum signal at roughly 3.3 MHz, which is intended for testing and training areas about 10-30 square miles in size. The novel TPS RF modulation scheme, although principally direct-sequence (DS) in nature, can also be frequency-modulated using a special hopping protocol, making it very difficult to intercept or jam as well as making it highly noise-resistant.

These features are especially important in urban areas. The special hybrid spread-spectrum technique utilized will be described later in detail.

The TPS portion of the invention makes use of modern solid-state modular transmitting hardware that can be deployed either within or external to the theater of operations. Transmit power levels can therefore be determined by the actual placement of the transmitters. Depending upon the transmit power levels (many tens of kilowatts or higher), ranges in excess of 1,000 km can definitely be obtained in the 100-kHz region, with reduced spans at higher frequencies (e.g., 3.3 MHz) due to the higher ground-wave propagation losses. The TPS signals are highly effective in foliage, rough terrain, and in urban areas. These ground-wave signals can complement GPS satellite signals and provide accurate position location in GPS-denied or degraded environments. These new signals of the invention can also permit the wide-area, real-time distribution of precision timing, tactical operational information and DGPS corrections via the embedded TPS navigation data stream. In addition, the TPS signals can be employed within the receiver to validate GPS position in order to dynamically detect multipath, jamming, or spoofing-induced errors in the GPS fix. The longer intrinsic RF wavelengths used in TPS will also facilitate more reliable position solutions in fast-movers and further serve to mitigate the cycle-ambiguity errors sometimes encountered with GPS. These units can also be networked for data reachback using ORNL's LPI/LPD hybrid spread-spectrum signaling protocol, which synergistically combines direct-sequence modulation with coordinated frequency/time hopping to provide an extremely robust, secure, power-efficient data link having excellent multiple-access properties.

Figure 3:
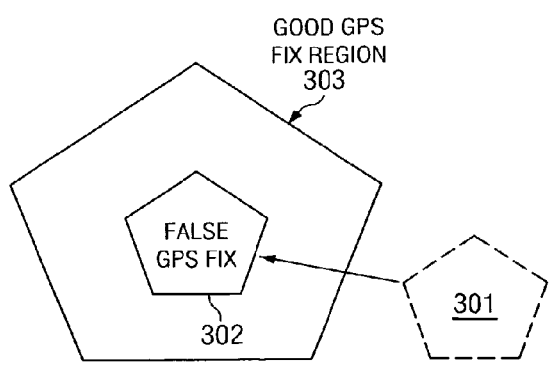
FIG. 3 shows the resistance to spoofing signals of the invention.

The basic operation of the integrated system is represented in FIG. 1. In the usual operating mode, GPS (102) serves as the principal positioning source. An ongoing internal system software routine continually examines the received GPS and TPS signal qualities (as represented by data integrity, tracking-loop error magnitudes and variances, loop lock states, continuity of position fixes, internal RF/IF AGC values, and front-end overload indicators). If for any reason GPS loses lock or exhibits sudden changes in loop tracking parameters (and thus the fix becomes suspect), the software automatically switches to tracking the TPS (101) position solution (normally horizontal-plane only). Continuity of the fix is assured, since during the normal TPS tracking process, the TPS and GPS position data are continually compared. As long as the recent and current GPS signal quality is good as determined by various statistical properties of the received GPS signals from each satellite (more on this process is discussed later), the TPS fix will be automatically adjusted to overlay the GPS values. This is generally done to provide an ongoing in situ calibration of the TPS signal propagation delay figures and thus "drag" the TPS fix in to match the GPS. If GPS suddenly fails to provide a clean or continuous fix, the TPS value will track the last good GPS coordinates. Thus, the invention can provide a "bumpless" transfer, which will be transparent to the user. Once GPS signal integrity is restored for at least a few seconds and a new lock with good quality is satisfactorily obtained, the TRINAV unit will smoothly revert to the GPS fix and return to normal operation. In the event that GPS is jammed or otherwise unavailable for an extended period, TPS will be employed in a standalone mode to derive the unit's fix, with a warning to the user that fix accuracies may be reduced. Since in virtually all instances the accuracy of TPS is controlled by the estimates of the TPS signal propagation speed over varying paths (land/water), soil types and moisture content, and terrain features (mountains, hills, canyons, etc.), the unit can improve TPS accuracy by carrying stored constants for characterizing the area and optimally correcting these variations. As previously mentioned, these constants will be continually and automatically updated for the area of operation using the valid GPS fix data during times of normal operation. As also mentioned earlier, a specific advantage of the inventive concept lies in the use of TPS as an anti-spoofing detector for GPS. For instance, if the TPS (presumed stable) and GPS planar fixes do not essentially coincide (i.e., where the GPS solution is considerably off from the TPS fix), this could be an indicator of GPS receiver problems or the presence of a spoofing signal. In FIG. 3, the potential solution zones are shown for both GPS and TPS, where the simplification is made so that five transmitters' signals are being processed for each system. On the right (301), it is assumed that the GPS and TPS solutions are consistent and thus overlay fairly well. If, however, the GPS indicates a much different position, as shown by the box on the left (303), it may be that a GPS spoofer or very strong multipath signal is present (302). In this event, the user is warned that the confidence of the fix may not be good. If either GPS or TPS loses lock, the position solution from the other can be used in situ to speed the search and re-acquisition process. The information-flow diagram of FIG. 1 indicates this with two "search" arrows. Further, the succession of GPS and TPS fix data are also used by the invention to support the operation of an adjunct inertial navigation system (INS) unit (103), which in the absence of any radio location data can alternatively provide timely location data to the user. Although for some critical applications a high-quality, low-drift INS will be needed, for the vast majority of users it is very desirable to utilize smaller, lower cost, but less stable devices such as MEMS accelerometers and gyros. Modern MEMS accelerometers are quite accurate and exhibit low drift, but typical inexpensive, low-power COTS MEMS gyros (e.g., the Analog Devices ADXRS150) are specified at ~70°/hour worst-case angular drift.

To make such devices useful for navigation, the system incorporates advanced device performance models in its software to more accurately predict the INS subsystem drift and other errors. As depicted in FIG. 1, the lower arrows represent the trajectory-based calibrations applied to the INS readout 103 derived from the GPS and TPS fix data. Thus, the 3 independent trajectories are continually compared and the INS gains, drift factors, and linearities are dynamically adjusted to match the GPS (presumed best) and TPS path data sets. Either triple-input Kalman filtering, Allan-style (i.e., statistically weighted, non-linear) filtering, multidimensional kernel techniques, or combinations thereof may be employed for the real-time GPS/TPS/INS integration processing. With appropriate temporal filtering, tracking the resulting displacements is relatively straightforward, but calculating the implied orientation angles is much more complex. Besides processing the coordinate transformations and compensating for the hysteresis, random-walk drift, and other parametric nonlinearities such as axis inorthogonality and acceleration-force compensation of the INS, the system must also provide means of initially orienting the INS at startup and at reasonable intervals before substantial errors can accumulate (an otherwise inevitable result due to INS drift). From previous experience, ORNL has found that flux-gate magnetometers can yield predictable north vectors (if well separated from ferrous objects), inexpensive tilt meters or other mechanisms (such as orthogonally-deployed accelerometers) can provide the gravitational reference vector, and high-quality barometric altimeters for vertical position can serve as useful adjuncts to the INS components. Another possibility is a novel electromagnetic gyroscopic sensor, described in a basic sense in U.S. Pat. No. 6,466,200 (and others) which may prove very cost-effective for the INS unit. Still another INS implementation, covered in principle in U.S. patent application Ser. No. 10/840,092, utilizes an array of orthogonal quartz crystals as accelerometers; by using 6 units mounted in a bi-orthogonal fashion, the 3 (X, Y, Z) linear accelerations and (using the pairs as couples) the 3 rotational accelerations (roll, pitch, yaw) can also be measured. More on the operation of this system will be described later. In any event, the selection and optimization of INS components for TRI•NAV will obviously be largely dictated by the overall application's performance requirements. As an aid to the RF systems, the integrated INS position data is used by the invention to provide holdup during the relatively rare (and limited-time) intervals when reception from both RF systems is impaired.

Figure 4:
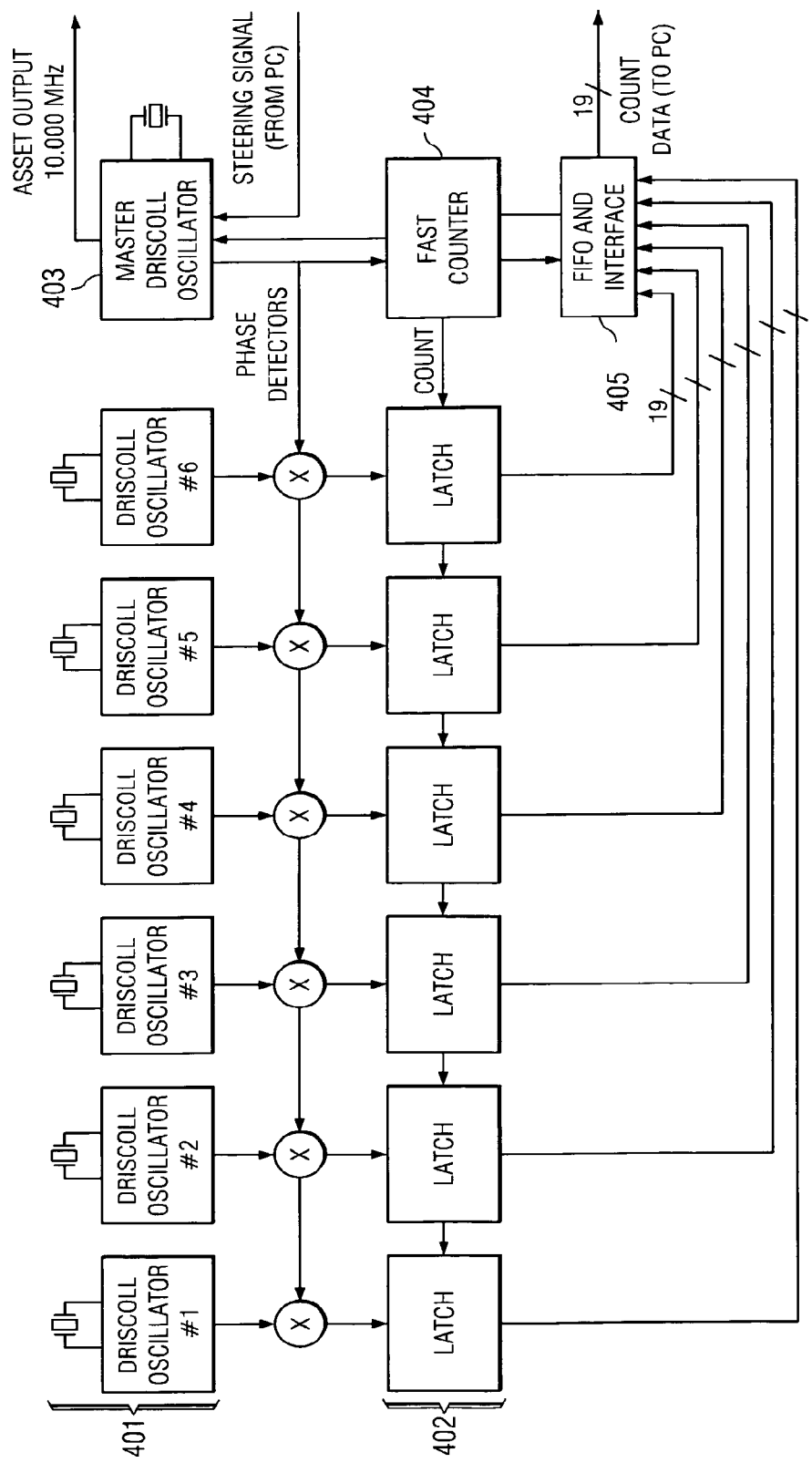
FIG. 4 shows a precision timing apparatus used by the invention.

The final major component of the invention is that of precision timing. Precise time is essential for most operational navigation platforms, particularly when accurate temporal coordination of widely deployed assets is required. Besides being the first component of the standard DoD TSPI requirement, precise timing improves communication networking efficiency (e.g., time-slotting accuracy, code synchronization times, range searching speed) and permits higher system power efficiency (reduced RX operation time) in TDMA networks. Such clocks are also ideal for infrequently transmitting devices with long operational lifetimes such as unattended ground sensors (UGSs). It is desired for a local-device clock oscillator to possess the stability of ovenized quartz or even Rb units, but it must use far less power. An ideal solution to this need is a stabilized oscillator array using technology developed by an ORNL strategic partner and described in U.S. patent application Ser. No. 10/840,092, filed on May 6, 2004. The system is known as EQUATE (Ensemble of Quartz-clocks Adapting To the Environment) and employs an ensemble of coordinated inexpensive quartz oscillators. The array, through special averaging of the multiple independent oscillator output frequencies, can achieve the output stability of a high-quality ovenized oscillator while using a fraction of the power and at a small fraction of the cost. EQUATE can be developed to meet low power, small footprint requirements (including chip-based electronics) and can deliver a high-stability output under harsh environmental conditions. EQUATE prototypes operating at a 10.00-MHz standard frequency already developed at ORNL have demonstrated short-term timing accuracies down into the 1-ns range (3-sec average) and are in the performance range required by the receiver. The next development efforts will be to optimize the long-term drifts, power, and unit packaging for filed deployment. FIG. 4 provides a block diagram of the EQUATE subsystem, showing an array of 6 oscillators 401, connected to latches 402, which in turn connect to a FIFO interface 405 and a fast counter 404. A master oscillator 403 serves as a feedback control.

Figure 5:
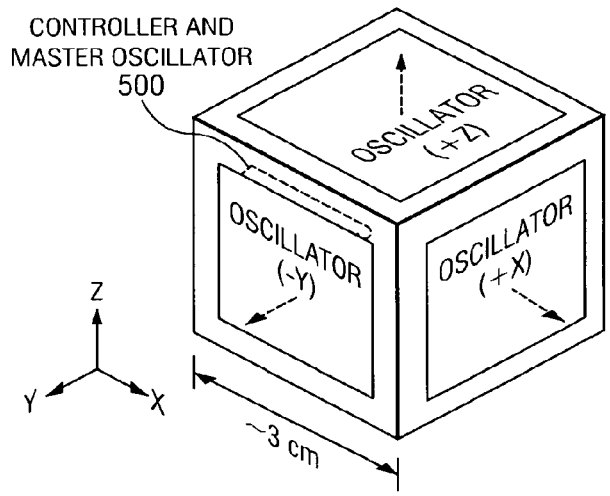
FIG. 5 shows one arrangement of a precision timing apparatus of the invention.

For more robust applications, the configuration of the 7-oscillator array can be modified from its conventional planar layout on a circuit board to form an essentially cubic module, as depicted in FIG. 5. Here, the arrayed oscillators 1-6 of FIG. 4 in the drawing are each placed on opposite faces of the cube, corresponding to directions +X, −X, +Y, −Y, +Z, and −Z, normal to the planes of the respective oscillators, as indicated. Thus, a pair of matched oscillators lies oppositely oriented on each orthogonal axis (X, Y, and Z). Since crystals are piezoelectric devices affected by directional stresses due to accelerations, the relative (i.e., opposed, orthogonal-axis) placement of the 3 biorthogonal oscillator pairs affords a significant reduction in motion-generated frequency shifts of the array output signals, since to a first order all the acceleration-induced frequency shifts tend to cancel in the combined array of 6. The 7th oscillator 500 (403 in FIG. 4) is controlled by the outputs of the 6 others, so its physical positioning is not relatively very significant. The slight changes due to acceleration of the oscillator circuits themselves, though usually at least an order of magnitude lower than the crystal effects, are similarly cancelled by the cubic arraying strategy.

Figure 2:
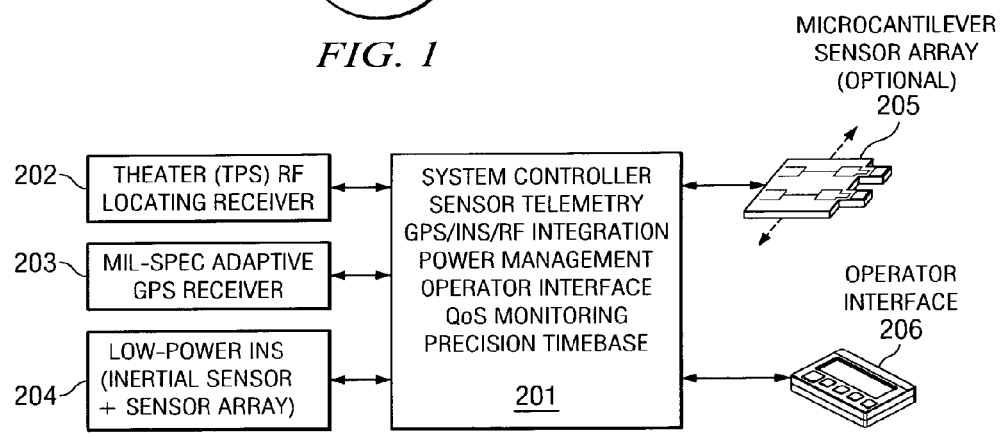
FIG. 2 shows one embodiment of the apparatus of the invention.

An overall block diagram of a complete user unit is provided in FIG. 2. The TPS unit 202 and GPS unit 203 feed their position data, status information (e.g., lock state, number of transmitters being tracked) and loop error signals back to the System Controller module 201. In addition, the Controller interfaces with the INS subsystem electronics 204, the operator interface/display unit 206, and any external sensors required by the application (such as the optional microcantilever array 205). The Controller also manages any required sensor telemetry (via RF link), handles the signal assessments (QoS monitoring), provides system power management, and performs all the computations needed to properly integrate the GPS, TPS, and INS subsystems and produce the fully integrated outputs to the user. The Controller also houses the EQUATE precision timebase and executes the internal oscillator controls and averaging software. The precise clock frequency of 10.00 MHz is also made available to the GPS and TPS receivers to assist in rapid reacquisition after signal disturbances. One of ordinary skill in the art would readily know how to implement the system controller functions through specific hardware and/or software components.

Thus, the salient feature of the TRINAV approach is that three (or more) essentially independent sources of navigation data (e.g., space systems such as GPS, terrestrial systems such as TPS or LORAN-C, and autonomous systems such as an INS), combined with an accurate onboard time source (e.g., the EQUATE clock unit), are fully integrated to provide the user an extremely flexible, reliable, and robust source of navigation data.

The following section describes the basic design of the TPS, which is a frequency-agile, programmable-bandwidth radio navigation system to support soldier training, combat systems testing, and military and civilian operational uses in GPS-denied environments such as dense forest areas, in urban and very rough terrain, and under jamming conditions (both intentional and unintentional). Employing software-defined radio (SDR) techniques, the system is intended to be highly adaptive in order to rapidly adjust to different testing scenarios by changing its frequencies, coding bandwidths, and channeling as required by the specific application. The fundamental basis for the system is a direct sequence spread-spectrum (DSSS) or hybrid spread-spectrum (HSS) signal, which is launched from multiple widely spaced, generally terrestrial transmitters. The radiolocating receiver acquires these continuous, overlapping code-division multiple-access (CDMA) transmitted signals, decodes them, and extracts the transmitter locations and times of transmission from data streams embedded in the respective DSSS or HSS signals, in a manner analogous to GPS units. The radio navigation solutions are then obtained by solving the usual systems of non-linear pseudorange equations by linearization techniques, Kaman filtering, Allan filtering, multidimensional kernels or other means, but with downstream corrections for the spherical-earth geometry and RF propagation factors governing the ground wave signals. However, there are several significant features of this Theater Positioning System (TPS) which clearly differentiate it from GPS, including its typical operating frequency range (<30 MHz), frequency- and modulation-agile capabilities, propagation modes (principally ground wave), and signal security mechanisms. In addition, the TPS signal structure is specifically designed to provide an effective back-up navigation source to GPS in difficult reception situations and afford maximal rejection of AC power-line noise to improve reception integrity and efficiency in urban areas. The TPS signal format also supports rapid lock-up of the receivers from even a cold start (often termed "time-to-first-fix" [TTFF]) by continually transmitting the exact locations (latitude, longitude, and height or equivalent coordinates) of the transmitters within their respective encapsulated data streams. Unlike in GPS, the receiver can then immediately measure the signals' delays, incorporate the required correction factors, and using the transmitters' coordinates solve for the receiver location. A final feature of the TPS signals permits wide-area broadcasting of low-rate data for commands, differential GPS (DGPS) corrections, differential TPS (DTPS) data, status information, alerts, and the like.

To achieve rapid prototype development, fast reconfiguration, and highly flexible signal-processing architecture control, the vast majority of the TPS hardware has been implemented via highly reconfigurable software-defined radio (SDR) techniques. The platforms for most of the TPS subsystems are custom, small, low-power circuit boards using FPGAs as the core logic elements, augmented by high-performance A/D and D/A converters to convert the analog RF signals to and from the digital domain. A model-based design environment utilizing MATLAB® and Simulink® modeling tools, coupled with the Xilinx System Generator™ FPGA-design add-in module, are employed by the invention to permit an efficient, tightly coupled design/test/update system implementation cycle and to provide rapid system alterations as required.

Figure 6A:
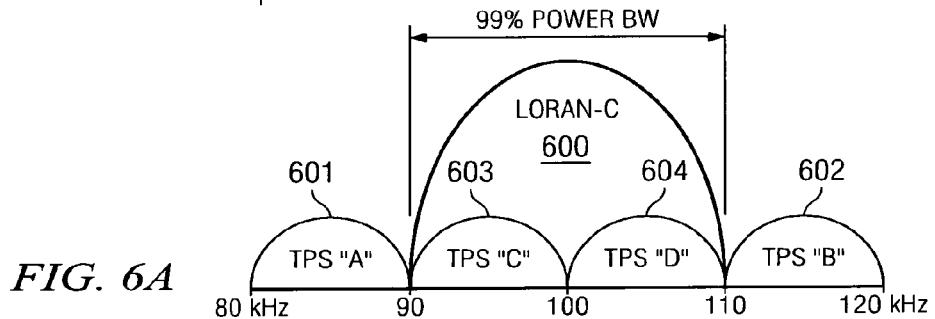
FIG. 6A shows one possible frequency allocation used by one embodiment of the invention.

The Theater Positioning System (TPS) incorporates a highly accurate and robust method for providing navigation information in operational military and other scenarios when and where standard GPS signals may be impaired due to such causes as multipath, RF interference, and/or active jamming by an adversary. Specifically, the TPS concept involves the use of a novel hybrid (combined direct-sequence/frequency/time-hopping) spread-spectrum RF transmission scheme which operates typically (but not necessarily) in the 80-120 kHz LF frequency range utilized in standard LORAN-C pulsed navigation transmissions. Specialized spread-spectrum codes are employed to provide high process gains (e.g., $\geq 30$ dB) to provide effective rejection of impulse noise and other sources of RF interference, including standard LORAN-C signals. Furthermore, the signal timing parameters are optimized for maximum immunity (on the order of 25-30 dB) from pickup of power-line related noise components in the TPS receiver by use of intrinsic data rates (prior to spreading) that are exact sub-multiples of the power-line frequency (i.e., 10-Hz bit rate, which is an exact sub-multiple of both 50 and 60 Hz). The basic TPS RF waveform is easily generated with conventional logic hardware and/or DDS (direct digital synthesis) devices readily available in the commercial market. The signal security and robustness lies principally in the use of customized spreading codes which are programmably related (i.e., segmented) between the direct-sequence and hopping modulation components. A navigation data stream of nominally 40 bits/sec for the preferred ABCD signal format in the 80-120 kHz band (20 bits/sec for the simpler AB band-edge add-on signal format for best LORAN-C compatibility) is also encapsulated within the spread-spectrum signal(s). This data can be used for TPS signal propagation prediction correction parameters, (much as the GPS concept provides ephemeris corrections via the 50-bits/sec GPS navigation stream) and for other signaling functions (FIG. 6A).

Figure 6B:
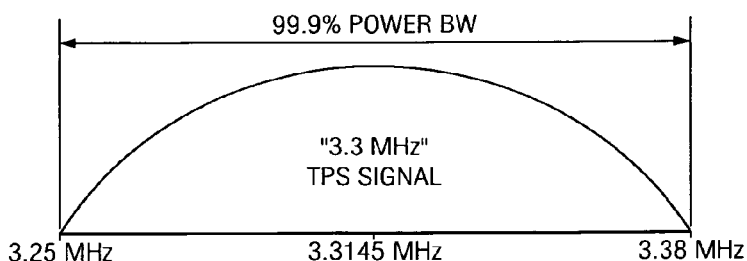
FIG. 6B shows one possible frequency allocation used by another embodiment of the invention.
Figure 6C:
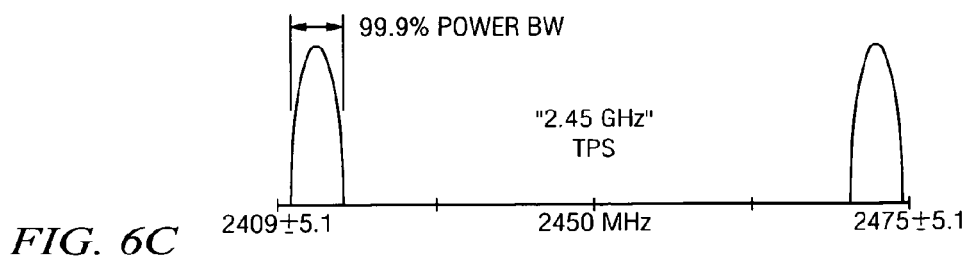
FIG. 6C shows one possible frequency allocation used by another embodiment of the invention.
Figure 6D:
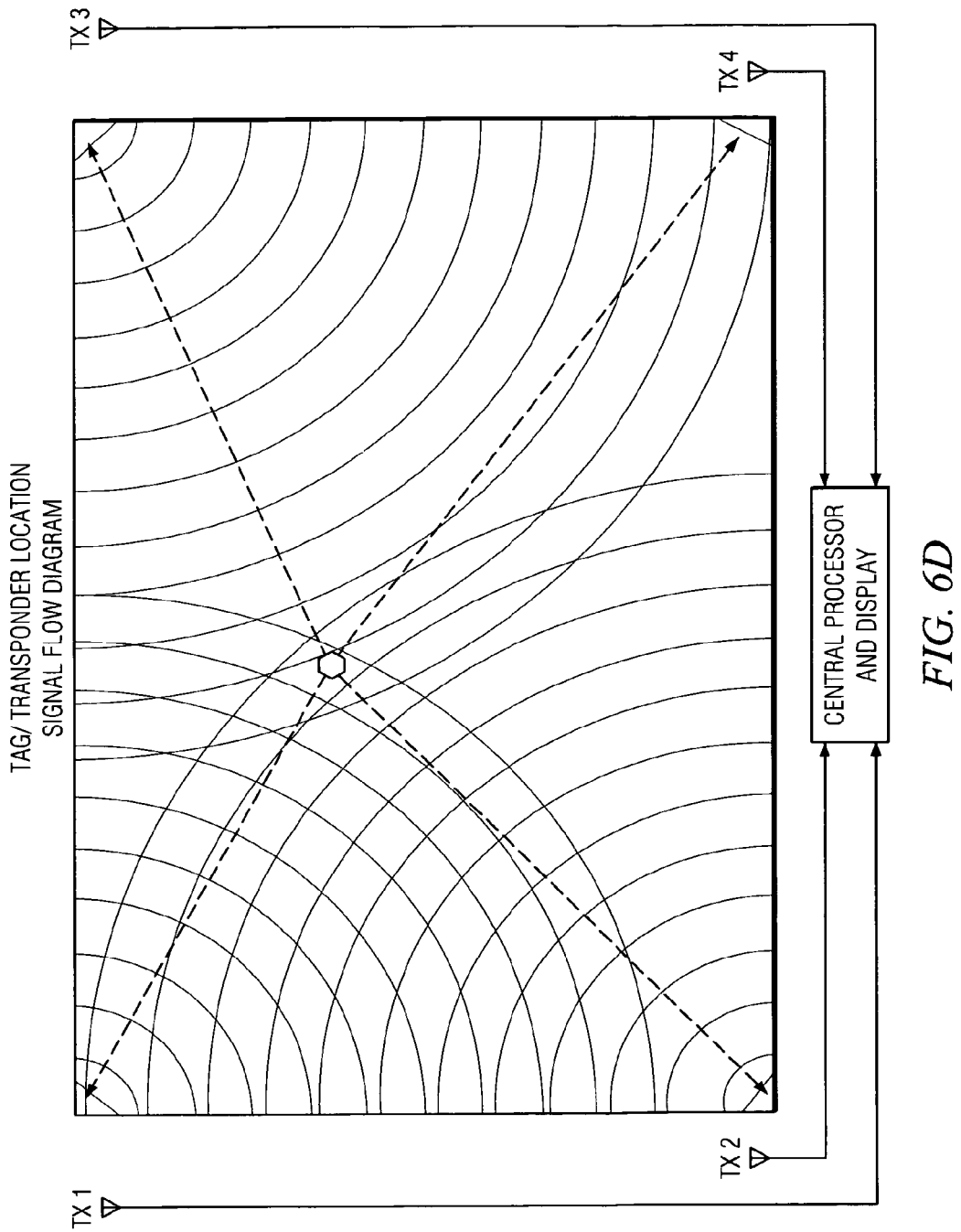
FIG. 6D shows one basic configuration of an indoor line-of-sight TPS scheme used by the invention.

Another typical format for the TPS involves the use of a low-HF signal in the vicinity of 3.3 MHz for short-range but more precise positioning applications. A navigation data stream of nominally 120 bits/sec (for this carrier, with its 61.38-kHz I/Q chip rates) is used with this version of the TPS signal, to concurrently provide faster lock-up and excellent rejection of 60-Hz power-line related noise components. This data can be used for TPS operational parameters, signal propagation prediction correction (much as the GPS concept provides ephemeris corrections via the 50-bits/sec GPS navigation stream), and for other signaling functions (FIG. 6B). Still another format for the TPS is a line-of-sight (LOS) version of the signal, for example in the 2.45-GHz ISM band, has been designed for use in line-of-sight (LOS) indoor and outdoor range testing applications. This system, although capable of 60-km total unambiguous range, can also be used for short-range indoor applications, where its resolution, with reasonable averaging and multipath conditions, can be well within ±1 cm. The LOS TPS format, by using two signals at the ISM band edges, permits the center of the band to be concurrently employed for telemetry or other signaling (FIG. 6C). Dual-mode TPS applications for larger MOUT-site testing venues would combine the 3.3-MHz ground-wave TPS signals for outdoor radiolocation of soldiers, vehicles, and other assets with a seamless transition to the 2.45-GHz ISM-band LOS TPS system to track soldiers indoors within MOUT structures used to simulate typical densely-packed urban environments. This LOS short-range system operation within an enclosure is depicted in FIG. 6D. Here, signals with the TPS LOS format are transmitted by the devices at the four corners of the enclosure; the TPS LOS-style receiver is in the central location in the mobile user unit. (This configuration is precisely the inverse of the typical applications described in U.S. Pat. No. 6,556,942 (issued to one of the current inventors), wherein the transmitter is at the center point (e.g., an RF tag) and the receivers are at the corners. Obviously, the ranging equations are essentially the same in both cases).

An additional key feature of the system involves the active, automatic locking of the multiple, remotely located TPS transmitters to a common frequency/timing reference source such as that obtainable via specialized GPS receivers and local clock oscillators. The extremely tight frequency/phase lock (usually to better than ~1 part in $10^{11}$) is required to provide stable relative phases between the various TPS transmitters' signals, which are required to maintain good positioning accuracy and signal quality at the TPS receivers in the field.

A major operational concern in the deployment of U.S. military, emergency, and law-enforcement personnel is the nearly exclusive dependence on the GPS satellite constellation for accurate position information in the field. Since GPS signals are comparatively weak (~10-15 dB below the typical background RF noise floor) and subject to significant degradation from multipath and RF interference (intentional and unintentional), the use of GPS is at times unreliable and even subject to deception ("spoofing") by an adversary [3]. The obvious consequences of inaccurate position information can be severe, up to and including loss of life of both friendly forces and/or noncombatants (civilians). Although inertial navigation systems (INS) have been proposed as short-term backups to GPS reception during outage periods, these units are in general too costly, heavy, bulky, inaccurate, and/or power-hungry to be deployed except in a few specialized applications. For the dismounted soldier, law-enforcement officer, or emergency crew-member and most platforms, a much more robust, inexpensive, and reliable GPS augmentation technique is needed, especially where outages may be of extended durations. For broad application areas, an RF approach is desirable; in addition, the use of ground-wave LF- to HF-band transmissions (depending on range) is radically different in propagation characteristics from GPS and thus provides a significant measure of signal diversity between the two radiolocation schemes. Further, the use of the TPS signals as a backup to GPS navigation offers far more consistent coverage than with GPS alone, since the low-frequency TPS signals can easily penetrate into most buildings, heavy foliage, urban terrain, and other areas where GPS signals are weak, unreliable, or even unavailable. Such expanded coverage is essential for successful operations in urban areas, very rough terrain, or in tropical or heavily forested regions. Furthermore, due to the extremely low signal strengths of the GPS satellite beacon transmitters at the GPS receiver, GPS signals are virtually always unusable indoors because of the additional attenuation of the overhead satellite signals by building roofs, upper floors, and other overhead structures, as well as trees and dense foliage in general. In addition, in "urban canyons" and in very rugged terrain, often there are too few GPS satellites in direct line-of-sight view of the receiver to obtain a sufficiently accurate (or timely) position fix. Again, TPS provides a much-needed improvement in locating-system reliability.

The TPS concept involves the use of a power-efficient, constant-envelope [1] direct-sequence spread-spectrum [2] RF transmission scheme which operates typically (but not necessarily) in the 80-120 kHz LF frequency range utilized in standard LORAN-C pulsed navigation transmissions. In FIG. 6, the basic TPS signal is split into two bands ("A" and "B", 601 and 602) which lie outside the 99% power bandwidth of LORAN-C (600) and thereby have essentially zero effect on conventional LORAN receivers due to the normal noise-rejection filtering already present. If desired, and for future data-bandwidth expansion, two additional signals ("C" and "D", 603 and 604) can be added. As noise-like, off-carrier spread-spectrum signals, they cause only a modest amount of interference to LORAN signals; in fact, at levels up to +7 dB relative to LORAN, in extensive tests with equal-level ABCD components they caused no observable degradation in LORAN positioning using both lab-grade and standard commercial-grade receivers. On the other hand, the band-edge AB signals alone caused no ill effects to LORAN reception at levels up to +18 dB relative to the LORAN signals, thus emphasizing the excellent interoperability of the 100-kHz band TPS signals with existing LORAN-C systems.

Alternatively, other frequency bands may be employed for the TPS as application requirements dictate. The efficient translation of the transmitting and receiving hardware to new frequencies, bandwidths, and data rates is accomplished via software-defined radio (SDR) techniques, which facilitate efficient, rapid design, prototyping, and testing through the use of modern reprogrammable FPGA devices which contain the digital signal processing hardware and even advanced software-controlled microprocessors. The latest version of TPS developed at ORNL operates at roughly 3.3 MHz to meet current Army system operational requirements for small-area testing and training activities.

Multiple, continuously broadcasting TPS transmitters are deployed around the desired coverage area in a code-division, multiple-access (CDMA) scheme. Specialized spread-spectrum codes are employed to provide high process gains (e.g., $\geq 30$ dB) to provide effective rejection of impulse noise and other sources of RF interference, including standard LORAN-C signals or other types of in-band signals. Further, the signal timing parameters are optimized for maximum immunity (on the order of 20-30 dB) from pickup of power-line related noise components in the TPS receiver. For the 3.3-MHz carrier system with its nominal 61.38-kHz I/Q chip rates (1023×60 Hz), a navigation data stream of nominally 120 bits/sec is also encapsulated within the spread-spectrum signal; this data is used for TPS parameters, signal propagation prediction correction data (much as the GPS concept provides ephemeris corrections via the 50-bits/sec GPS navigation stream), and for other signaling functions. An additional key feature of the system involves the active, automatic locking of the multiple, remotely located TPS transmitters to a common frequency/timing reference source such as that obtainable via specialized GPS receivers and highly stable local clock oscillators. The extremely tight frequency/phase lock (usually to better than ~1 part in $10^{11}$) is required to provide stable relative phases between the various TPS transmitters' signals, which are required to maintain good positioning accuracy and signal quality at the TPS receivers in the field.

Suitably stable reference sources other than GPS can alternatively be employed, including signals from WWVB, LORAN-C, OMEGA, and other sources such as GOES satellites, CDMA cell-phone base stations, and (with appropriate averaging techniques) one of several VLF, LF, or HF standard-frequency broadcast signals including WWV, WWVH, CHU, NAA, NLK, NSS, NPM, etc. In general, the stability of the VLF and LF signals markedly exceed (~1 part in $10^{10}$ to $10^{11}$) those of the HF stations (~1 part in $10^7$). Standard AM broadcasting (540-1700 kHz), international shortwave broadcasting, and analog television broadcasting in both U.S. and foreign venues may also be used as stable reference sources, with appropriate signal processing and averaging techniques.

The basic configuration of the TPS scheme is shown in the accompanying diagram of FIG. 7. The TPS transmitters 701 are typically (although not necessarily) deployed outside the main area of operations 700, in a reasonably regularly spaced array to provide favorable angles of reception from the various transmitter locations (i.e., "good system geometry" or "cuts"). In the field of navigation, this consideration is termed "dilution of precision" (DOP), which is the geometrically induced degradation due to non-perpendicular angles between pairs of reference points used in determining the location of an unknown position. Mathematically this is generally expressed as: $DOP = \csc\theta$. (where $\theta$ is the included angle between the two vectors between each reference point and the unknown position being calculated) For a fairly flat terrain profile, the TPS system will provide useful two-dimensional location data; if special provisions are made to generate TPS transmissions at varying heights (e.g., via elevated balloons, aircraft, etc.), the system can produce three-dimensional readings as well, although the accuracy in the vertical direction (due to the geometric dilution-of-precision effect) will typically be noticeably lower than in the horizontal plane, much as with GPS. The mathematical equations used to calculate the respective ranges from the TPS receiver to the transmitters in the area (which could easily exceed 1000 km in distance), called the pseudorange equations in GPS parlance [3, 4] are similar to the GPS versions, except that the TPS transmissions are generally from stationary sources and, as such, do not need Doppler or relativistic corrections to the pseudorange values before computing the location solution in the receiver. They do, however, require great-circle distance corrections for the ground-wave signal paths on the earth's surface and adjustments to the propagation velocity values over the intervening terrain due to changes in the dielectric constant from varying soils, moisture content, etc. Like GPS, the TPS setup utilizes a precise common time base to provide highly accurate, stable time-of-day information for each transmitter. As in GPS, a stable clock in the TPS receiver permits faster initial signal acquisition and more accurate positioning via algorithms, which incorporate strategic averaging among the various TPS signals. Interestingly, the at least occasional availability of clean GPS time signals at the TPS receiver will further enhance the TPS positioning accuracy in the field due to the benefits of the common time reference.

TPS typically operates to determine the position of a user's receiver by acquiring signals transmitted by a group of TPS transmitters distributed in a region on the surface of the earth. The TPS transmitters employ direct digital synthesizer (DDS) hardware driven by the local precision timekeeping oscillators to generate highly stable spread-spectrum waveforms which will then be amplified to the required RF power levels and broadcast through specially characterized, vertically polarized antennas for greater coverage and ease of deployment. The user's position on the surface of the earth is calculated relative to the center of the earth [in 3 dimensions] or relative to the surface of the earth [for 2 dimensions] by multilateration based on signals received from multiple (usually 4 or more) TPS transmitters. The distance from the user to a transmitter is computed by measuring the propagation time required for a direct-sequence spread spectrum "ranging code" signal transmitted by a given transmitter to reach the receiver. A fourth transmitter is employed to permit a simultaneous solution of both the position and the system time. This avoids the need for a costly super-accurate clock in the TPS receiver.

A ranging code is a pseudorandom code sequence that is generated by a polynomial generator according to a known algorithm, each bit of which is called a "chip" to distinguish it from the true data bits that might form a message encoded onto the ranging code. A "chip" is a single bit in a pseudo-random code sequence used to spread the spectrum of an information signal. The pseudorandom ranging code sequence, when broadcast by radio, has a spectrum that has widely dispersed sidebands relative to the carrier frequency, and thus is referred to as a "spread-spectrum" signal. Spread-spectrum signals are known to have desirable characteristics for data security and resistance to radio-frequency (RF) interference.

Within a TPS receiver, an identical ranging code signal is generated and shifted in time (or phase) until it achieves correlation with the specific transmitter-generated ranging code being acquired. The magnitude of the time shift of the identical ranging code signal within the receiver relative to the transmitted ranging code provides a time differential that is related to the transmitter-to-user range. To determine user position in three dimensions, range measurements are made to a plurality of transmitters, resulting in four (or more) simultaneous ranging equations that have four (or more) unknowns. These equations can be solved by computer systems to determine the values of x, y, z (the 3-dimensional location of the user's receiver), and $\Delta t$, which is a clock error. There are several closed-form solutions furnished in the navigation literature for solving the equation to determine the unknown quantities. The positioning is in general accomplished by determining the time-of-flight of the signals from at least 4 TPS transmitters, and by careful processing of the real-time data from the multiple transmitter clocks (and other, small corrections) the actual distances are computed; the common solution to the set simultaneous distance equations, coupled to the known transmitter locations, provides the TPS receiver's position.

There are two basic techniques employed with the TPS architecture to deal with the well known "near-far" problem encountered with standard CDMA systems, which require that all of the various CDMA signals be of comparable (ideally, the same) levels at the receiver's input. In typical CDMA cellular phone systems, the varying received levels from different units in the field are countered via a closed-loop power-control methodology, where the individual cell phone senses the base station's incoming signal level and then adjusts its own transmit power accordingly as a first estimate. The base station then sends control data back to the phone to fine-tune its power to within 1-2 dB. The resulting small level errors among the various phones received by the base station's master receiver are easily handled in the simultaneous detection/correlation CDMA receiver. Since the various spreading codes are sufficiently orthogonal to mask these amplitude errors, no false correlations occur and the signals are all still separable. Similarly in GPS, the satellites' C/A 1023-length Gold codes are all approximately mutually orthogonal (~22-24 dB) and the level variations at the receiver are typically no worse than about ±6 dB, since the satellites all have roughly the signal strengths at the GPS receiver due to similar path losses (though somewhat more near the horizon). Thus, the GPS signals are always adequately separable in the receiver unless there are local structures or terrain features obstructing some of the signals. GPS does not employ any form of transmitted power control, but the system propagation parameters just described obviate the need for such.

TPS likewise does not normally employ dynamic power control, although the transmitters' power levels can be adjusted in the field (or remotely) for best, most uniform signal coverage in the desired service area. Unfortunately, since the TPS ground-based receivers can be located relatively much closer to one of the transmitters than the others, it is quite likely that a wide disparity in the levels of the incoming TPS signals will be encountered by the TPS user, perhaps approaching 30 dB, depending on his relative position and the local terrain losses. Assuming for TPS a similar set of 1023-length spread-spectrum codes (e.g., Gold or Kasami polynomials) with comparable mutual code orthogonalities (~22 dB worst-case), then for adequate code separability in the receiver correlators, a safely allowable "near-far" amplitude ratio among the CDMA signals would be about 12 dB (leaving about 10 dB above the multiple-access noise level for proper post-correlation data detection). The interference-canceling (I-C) receiver topology of FIG. 17, as described in later paragraphs, can generally achieve about 30 dB of additional separation by progressively canceling the largest signal, then the second largest, and so on, until the weaker ones are able to be separated out and decoded. However, about 35-40 dB is a maximum possible dynamic range for the I-C receiver chain; in some instances though, particularly close in to one of the TPS transmitter sites, the local signal may be much higher than the others (e.g., about 60 dB). In this case, no conventional receiver, or even the I-C scheme, can successfully handle this wide range of CDMA signal levels without "losing" the weakest ones, so all the TPS transmitters can be operated in an "inverse-pulse" mode, in which each unit, in a predetermined time sequence, is gated off or at least reduced in power about 40-50 dB (see FIG. 21). During this "quiet" interval, which typically can run from 5-25% of the total data-cycle period depending on system specifics, the I-C TPS receiver can establish a new lock and develop a correct fix with the remaining TPS signals (assuming 4 or more are still receivable). If fewer are available, the receiver, having previously stored the pseudorange and corresponding correction factors from the strong local signal, will proceed to calculate the fix using the stored data as well. This "inverse-pulse" technique effectively adds another 40-50 dB (or more) to the usable system dynamic range and thus solves the classic near-far problem for TPS. Concatenating all the above techniques can achieve an overall TPS signal dynamic range in excess of 80 dB, which is fully adequate for all practical operational scenarios. A further means of improving the separability of the TPS spread-spectrum signals is to transmit true hybrid spread-spectrum (HSS) instead of simple DSSS modulation. The addition of a frequency-hopping component which is orthogonal with respect to the underlying bit rate can provide additional separation in the transmitted signals, with a very modest increase in the transmitter circuit complexity and a small increase in receiver hardware. Further, the use of HSS signaling can significantly improve signal security properties by inhibiting the normal PLL acquisition of the signals by the significant effective jitter caused by the additional frequency-hopping component. The unauthorized user will have difficulty locking to the signal, while the authorized user, possessing the correct decoding hardware configuration, will be able to acquire the signal at will.

The TPS transmitters employ direct digital synthesizer (DDS) hardware driven by the local precision timekeeping oscillators to generate highly stable direct-sequence (DSSS) or hybrid spread-spectrum (HSS) waveforms which will then be amplified to the required RF power levels and broadcast through specially characterized, physically short, vertically polarized antennas for greater ease of deployment. Since the RF wavelength at 100 kHz is 3000 m, it is very desirable to utilize wire-antenna arrays to minimize the needed vertical height. One such antenna is the "Star-H", originally designed by Star-H Corporation of State College, Pa. and currently manufactured for AM broadcasting frequencies by Kintronic Labs in Bluff City, Tenn. At the nominal 100-kHz center frequency, the commercial "KinStar" design would consist of four wires in an inverted-L quadrapole configuration, each roughly 756 ft (230.43 m) high and 1680 ft (512.065 m) long, arranged in 4 quadrants around a central circle of 168 ft (51.21 m) diameter. Such a structure could be easily fabricated with a common center-lift arrangement for rapid setup via balloon or aerostat launch, as shown in FIG. 7. Correspondingly, at a carrier of 3.3 MHz, the corresponding distances would be roughly 22.9 ft and 50.9 ft respectively; the standard quarter-wave vertical antenna for this frequency would be close to 74 ft. At higher carrier frequencies, the antennas would obviously be correspondingly shorter.

Transmitter Implementation

Figure 8:
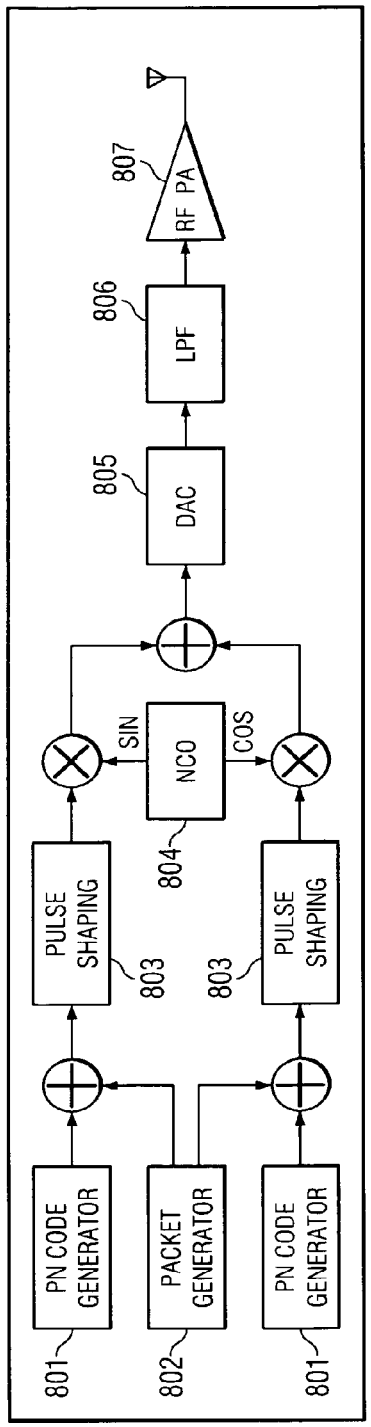
FIG. 8 shows the block diagram of a transmitting system used by the invention.

The basic TPS transmitter signal source, as shown in FIG. 8, consists of a pair of PN code generators 801, nominally employing 1023-length Gold-code polynomials, which via an XOR operation (the $\oplus$ symbol) direct-sequence (DS) spread the TPS navigation data stream (emerging from the Packet Generator block 802). Data contained in the packet consists of the 3-D transmitter location (80 bits), system time (64 bits), system data (16 bits), error-correction, and sync bits. The separate in-phase (I) and quadrature (Q) continuous spread-spectrum data streams are shaped (803) for bandwidth control and modulated (the "x" symbol) onto the respective phases of a programmable-frequency RF carrier generated by a numerically controlled oscillator (NCO) 804. The two quadrature components are then summed (at the "+" sign), and smoothed by a low-pass filter 806 (LPF) to form a composite output signal; all these steps are generally performed within a high-density FPGA chip. The 14-bit SOQPSK-modulated digital output from the FPGA is then applied to an external digital-to-analog converter (DAC) 805; the resulting constant-envelope analog output is then fed to a high-efficiency RF power amplifier (RF PA) 807 and boosted to about a 100-W level before being applied to the transmitting antenna. The entire unit is designed to be powered via a switching supply from a nominal 12-V DC battery source (or alternatively, a standard 120-V AC generator) to facilitate field operations.

Receiver Implementation

Figure 9:
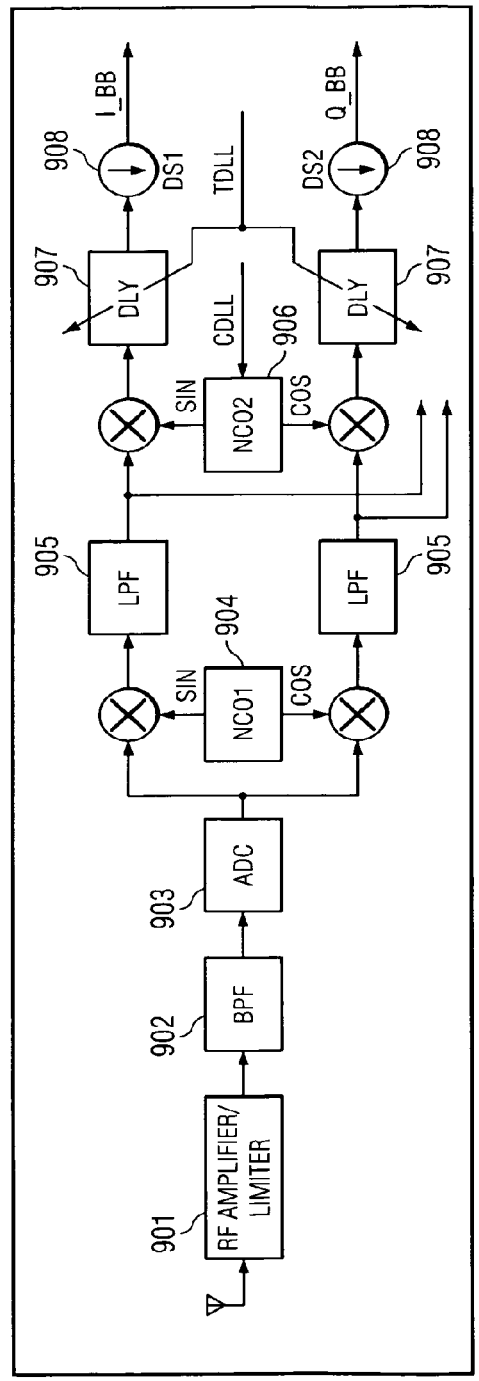
FIG. 9 shows the block diagram of a receiving system used by the invention.
Figure 10:
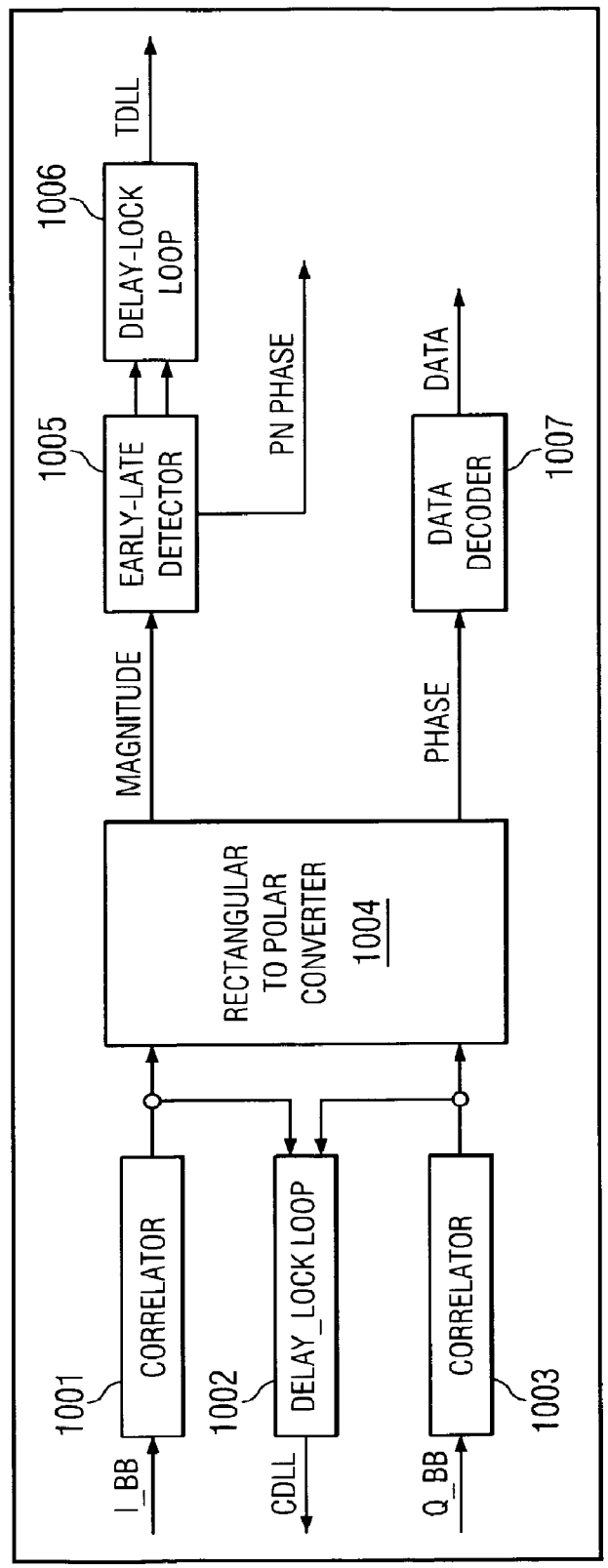
FIG. 10 shows a schematic of the decoder and loop controller parts of the receiver.

The front end of the basic dual-conversion TPS radiolocation receiver is shown in block diagram form in FIG. 9 below; FIG. 10 shows the downstream data-extraction circuitry. The received signal from the antenna is first bandpass filtered and amplified in a low-noise amplifier block 901 with wide-range automatic gain control and integral, multistage limiting to reduce large impulse-noise spikes and minimize front-end/mixer overload. A second, tighter bandpass filter (BPF) 902 precedes the analog-to-digital converter (ADC) 903 to minimize out-of-band noise, spurious signals, and aliases. The ADC is a fast 14-bit unit to provide high signal resolution and good dynamic range for the subsequent FPGA-based signal processing chain. The digitized input signal is first downconverted to a very low intermediate frequency (IF) via the quadrature outputs of the first local oscillator (NCO1) 904 and the two (I and Q) mixer/multipliers, denoted by the "x" symbols above and below the NCO block. The I and Q signals are then low-pass filtered (LPF) (905) to remove mixer products and out-of-band noise and introduced to a low-frequency (near-DC) data demodulation and synchronization loop. These signals are also routed to other, parallel channel processors (one per transmitter); a typical channel is shown at right in FIG. 9, continuing into FIG. 10.

The low-IF signals are converted to baseband (via NCO2 906 and its associated multiplier/mixers) in an extended Costas loop circuit that provides spread-spectrum chip demodulation, correlation, and synchronization. However, since chip-based ranging alone cannot achieve the required radiolocation accuracy at the relatively low carrier frequencies for TPS (as compared with GPS), the normal Costas demodulator is augmented with a secondary carrier-phase detection loop (the CDLL) which can lock to within better than 0.3° (within ±1 part in 1024 of the carrier cycle). In acquisition, the carrier phase is first estimated and an initial sequence of chips is correlated and demodulated. The tandem programmable delay registers (DLY) 907 adjust the timing of the downsampling blocks (DS1, DS2) 908 of the I and Q baseband signals, which in turn feed the respective channel correlators 1001 and 1003 of FIG. 10. To simplify the task of synchronization, the I and Q channels for each TPS transmitter are assigned different spreading codes, to distinguish which channel is I and which is Q. The normal Costas-loop data polarity (value) ambiguity is resolved by transmitting dedicated header sequences (much as in GPS); the receiver then selects the required sign to retrieve the correct chips.

Figure 11:
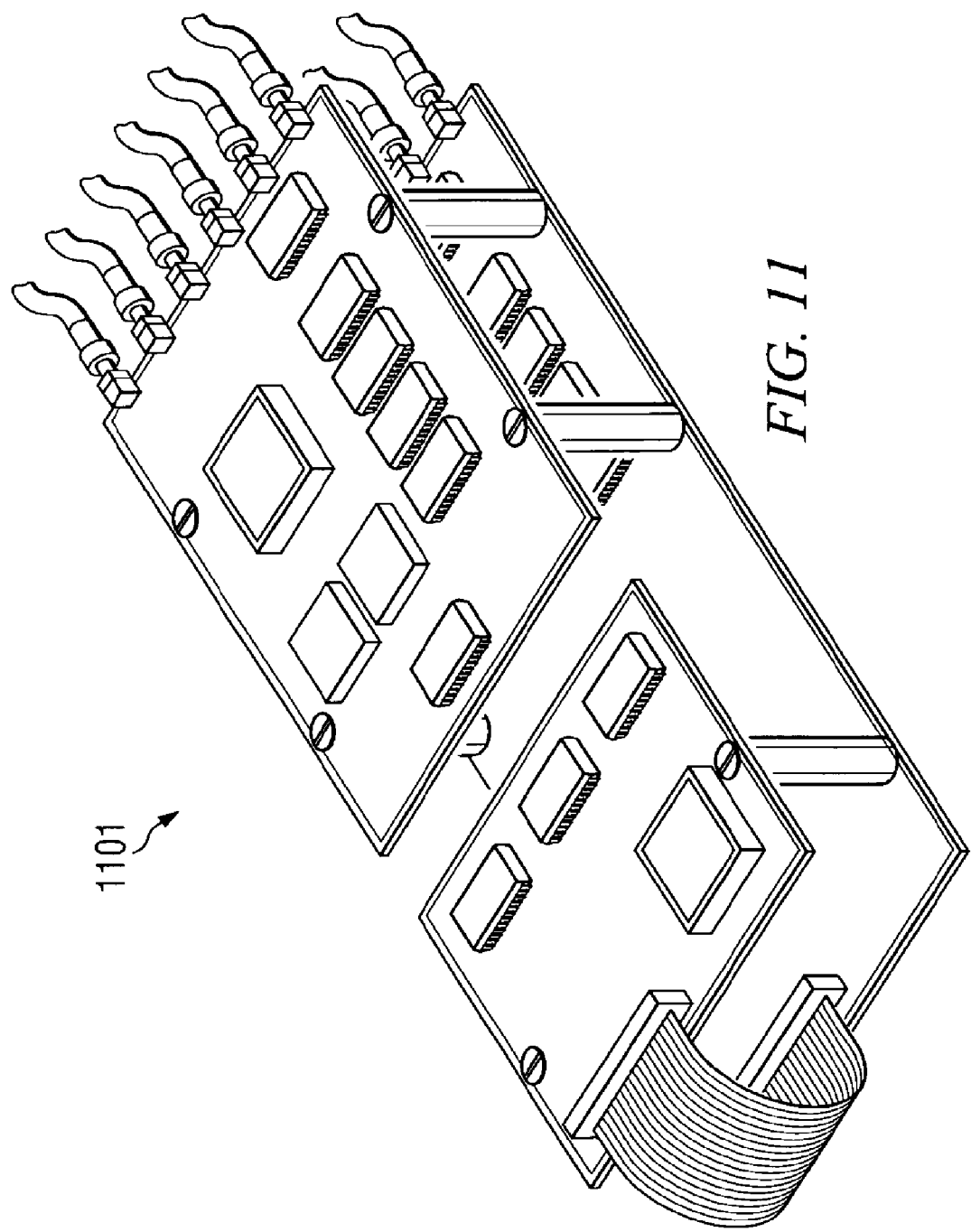
FIG. 11 shows a picture of the hardware of a TPS receiver.

The outputs of the I and Q correlators (FIG. 10) feed back to the carrier delay-lock loop controller 1002 and also provide inputs to the rectangular-to-polar transformation logic 1004, which takes the Cartesian I/O sample values and converts them to polar (R, φ) magnitude and phase values. The magnitude signal (top) is sent to an early-late correlation detector 1005, which reads out the fine PN code-phase values and also adjusts the timing delay-lock loop [TDLL] 1006 for convergence. Meanwhile, the respective chip-wise carrier phase values [bottom] are sent to a conventional QPSK-type DS data decoder 1007 to extract the TPS data stream, which includes transmitter IDs, locations, and the precise system time marks used in the subsequent navigation algorithms to calculate the user's position. FIG. 11 shows the TPS receiver system electronic hardware 1101.

Navigation Algorithms

As mentioned above, the multilateration radiolocation algorithms for TPS are generally similar to those used in GPS [3, 4] except for the addition of great-circle corrections to accurately represent the lengths of the ground-wave propagation paths on the nearly spherical earth and (obviously) the deletion of the satellite almanac and ephemeris data. In most operational scenarios, the TPS transmitters will be locked to GPS time with very high-quality clocks; plus, their locations will be pre-surveyed and will be known to fractions of a meter. The respective TPS data streams will thus provide all the information needed by the receiver (except for onboard-stored local propagation-correction tables) to accurately compute its position. Due to the finite conductivity of the earth's surface, and local variations due to surface types (i.e., land or water), soil, moisture content, temperature, and (to a lesser extent) season, the average signal velocity at LF must be reduced by roughly 0.15%. In addition, the curved path on the earth's surface requires generic great-circle distance computations, plus some additional corrections for local-area topographical irregularities. All these corrections are performed by the TPS navigation software.

Within each channel of a TPS receiver, an identical (replica) ranging code signal is generated and shifted in time (or phase) until it achieves peak correlation with the specific transmitter-generated ranging code being acquired. The magnitude of the time shift of the identical ranging code signal within the receiver relative to the transmitter transmitted ranging code provides a time differential that is related to the transmitter-to-user range. To determine user position in three dimensions, range measurements are made to multiple transmitters, resulting in at least four simultaneous ranging equations with four unknowns. These equations can be solved by computational algorithms to determine the values of x, y, z (the 3-dimensional location of the user's receiver), and $\Delta t$, which is a clock error. There are several closed-form solutions available for solving the equation to determine the unknown quantities. The positioning is in general accomplished by determining the time-of-flight of the signals from at least 4 TPS transmitters, and by careful processing of the real-time data from the multiple transmitter clocks (and other, small corrections) the actual distances are computed; the common solution to the set of simultaneous distance equations, coupled to the known transmitter locations, provides the TPS receiver's position. Thus, the equivalent geometric range is given by:

$$r = c(T_u - T_s) = c\Delta t, \quad (1)$$

where:
r=actual path distance (great-circle for ground wave signals)
$T_s$=system time when signal left the transmitter
$T_u$=system time when signal reached the receiver
$\delta t$=offset of transmitter clock from system time
$t_u$=offset of receiver clock from system time
$T_s+\delta t$=transmitter clock reading when signal left transmitter
$T_u+t_u$=receiver clock reading when signal arrived
c=speed of wave, corrected for path propagation
$(x_u, y_u, z_u)$=position of the receiver in 3 dimensions
$(x_j, y_j, z_j)$=3-dimensional position of the jth transmitter (j=1 to 4).

For TPS, the usual rectilinear path computations used in GPS ranging have been altered to accommodate the ground-wave propagation and great-circle path distances. This is done by adjusting the equivalent speed of the wave for the slower propagation along the earth's surface. The curved-path distances may then converted to the equivalent chord distances to utilize the normal rectilinear distance equations. The ground wave follows the great-circle distance between two points on the earth's surface (assumed spherical), which can be computed by the following formula, where $\delta_1$ and $\phi_1$ are the latitude and longitude respectively of the first point, and $\delta_2$ and $\phi_2$ are those of the second. If r is the earth's radius (approximately 6367 km on average), then the great-circle distance d is approximately:

$$d(\delta_1,\phi_1,\delta_2,\phi_2) = r\cos^{-1}[\sin\delta_1 \sin\delta_2 + \cos\delta_1 \cos\delta_2 \cos(\phi_1-\phi_2)], \quad (2)$$

or, in a form with smaller rounding errors, $$d(\delta_1,\phi_1,\delta_2,\phi_2) = 2r\sin^{-1}\{\sin^2[(\delta_1-\delta_2)/2] + \cos\delta_1 \cos\delta_2 \sin^2[(\phi_1-\phi_2)/2]\}^{1/2} \quad (3)$$

In these terms, the pseudorange is given by:

$$\rho = c[(T_u + t_u) - (T_s + \delta t)] \quad (4)$$
$$= c(T_u - T_s) + c(t_u - \delta t)$$
$$= r + c(t_u - \delta t)$$

and the 4 pseudoranges are thus:

$$\rho_1 = [(x_1-x_u)^2+(y_1-y_u)^2+(z_1-z_u)^2]^{1/2}+ct_u \quad (5)$$

$$\rho_2 = [(x_2-x_u)^2+(y_2-y_u)^2+(z_2-z_u)^2]^{1/2}+ct_u \quad (6)$$

$$\rho_3 = [(x_3-x_u)^2+(y_3-yu)^2+(z_3-z_u)^2]^{1/2}+ct_u \quad (7)$$

$$\rho_4 = [(x_4-x_u)^2+(y_4-y_u)^2+(z_4-z_u)^2]^{1/2}+ct_u \quad (8)$$

These nonlinear equations may be solved by either closed-form methods [5], iterative techniques based on linearization, or by Kalman filtering [6], Allan filtering, multidimensional kernels [7], or other equivalent estimation algorithms. Note that in the case where a good common-time reference exists between the transmitters and receiver, the various $\delta t$ and $t_u$ terms become vanishingly small. In the preferred TPS system implementation, highly stable rubidium or even cesium clocks would be employed at the distributed transmitter sites to maintain an extremely stable common time base, which will be augmented by periodic cross-checks with the GPS constellation via advanced common-view techniques to assure accurate wide-area time commonality (to perhaps a few nanoseconds).

Figure 12:
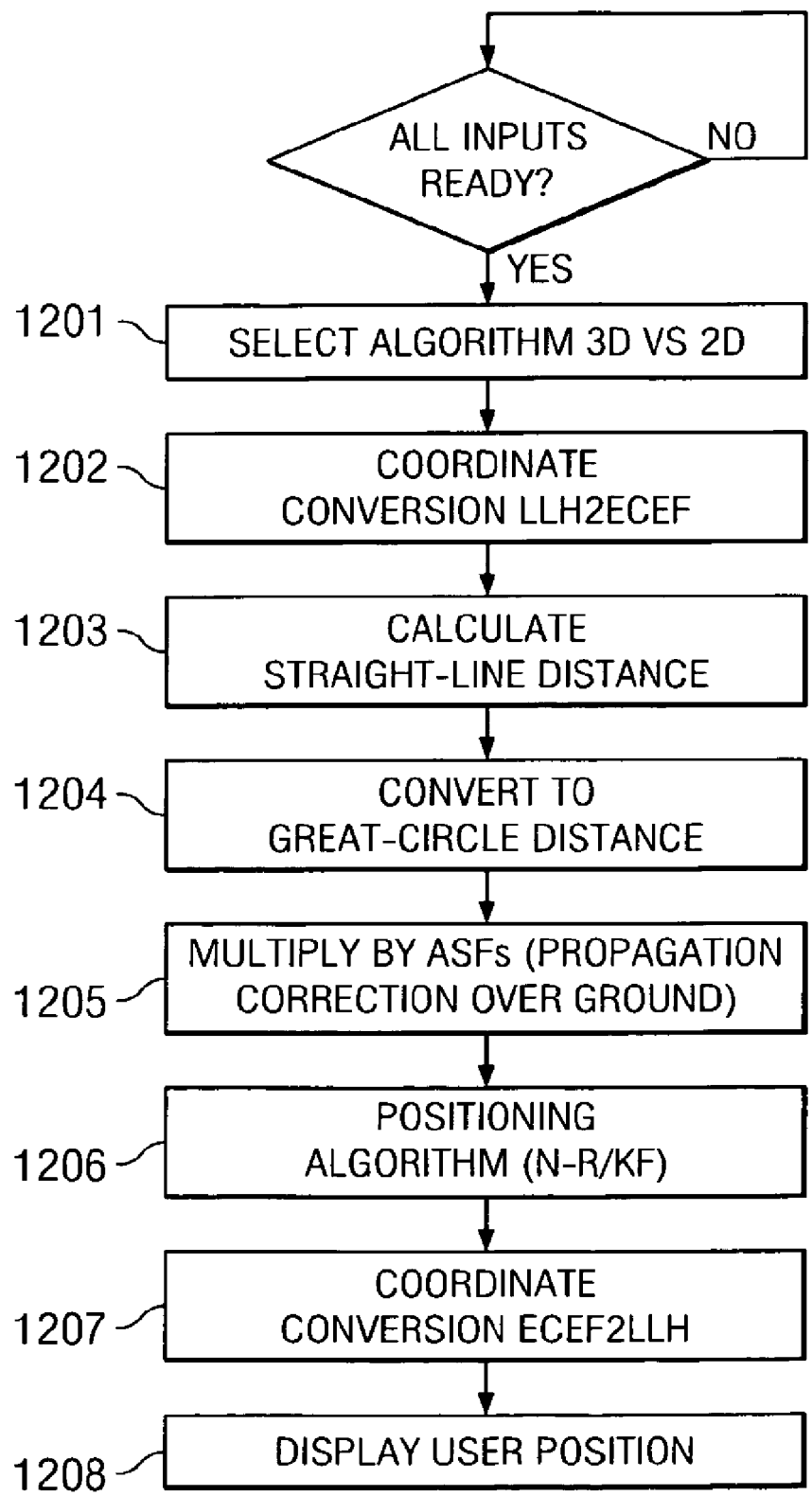
FIG. 12 shows an overall TPS radiolocation algorithm. Inputs: (5 TX positions relative delays); LLH: Longitude-Latitude-Height; ECEF: Earth-Centered-Earth-Fixed; ASFs: Additional Secondary Factors typically 1.00150202253.

The overall locating algorithm, illustrated in FIG. 12, unlike in GPS, may be either a 2-D or 3-D type, based on the available data sets. Since with all land-based transmitters TPS in its basic form can only be used as a "planar" or 2-D locating system, often the data will only support 2-D calculations, since the normal 3-D algorithms will usually experience poor convergence (overly long solution times) when the data sets have little deviations in one dimension; this is the result of the high DOP conditions and can result in no solution at all if convergence of the computations fails. The first block 1201 in the algorithm thus selects the appropriate procedure (2-D or 3-D), and then performs the conversion (1202) to translate latitude-longitude-height (LLH) coordinates of the transmitters and initial receiver location estimate to the standard earth-centered, earth-fixed (ECEF) format. Next, the straight-line point-to-point (chord) distances are determined (1203) from the standard geometric equations and corrected for the great-circle (arc) distances (1204), assuming a near-spherical earth. Thus, the effective positions of the transmitters are shifted radially outward from the presumed receiver location to account for both the curvature of the earth's surface and the propagation speed of the RF signals over the earth's surface, including soil, water, and variations thereof. Once the effective distances have been determined (1205), the positioning algorithm (either a Newton-Raphson routine, a Kalman filter, or other method) 1206 then is employed to solve the set of simultaneous linear (or linearized) equations to find the receiver's actual location in ECEF coordinates. Generally, these are re-converted to LLH format (1207) and displayed for the TPS user (1208).

Figure 13:
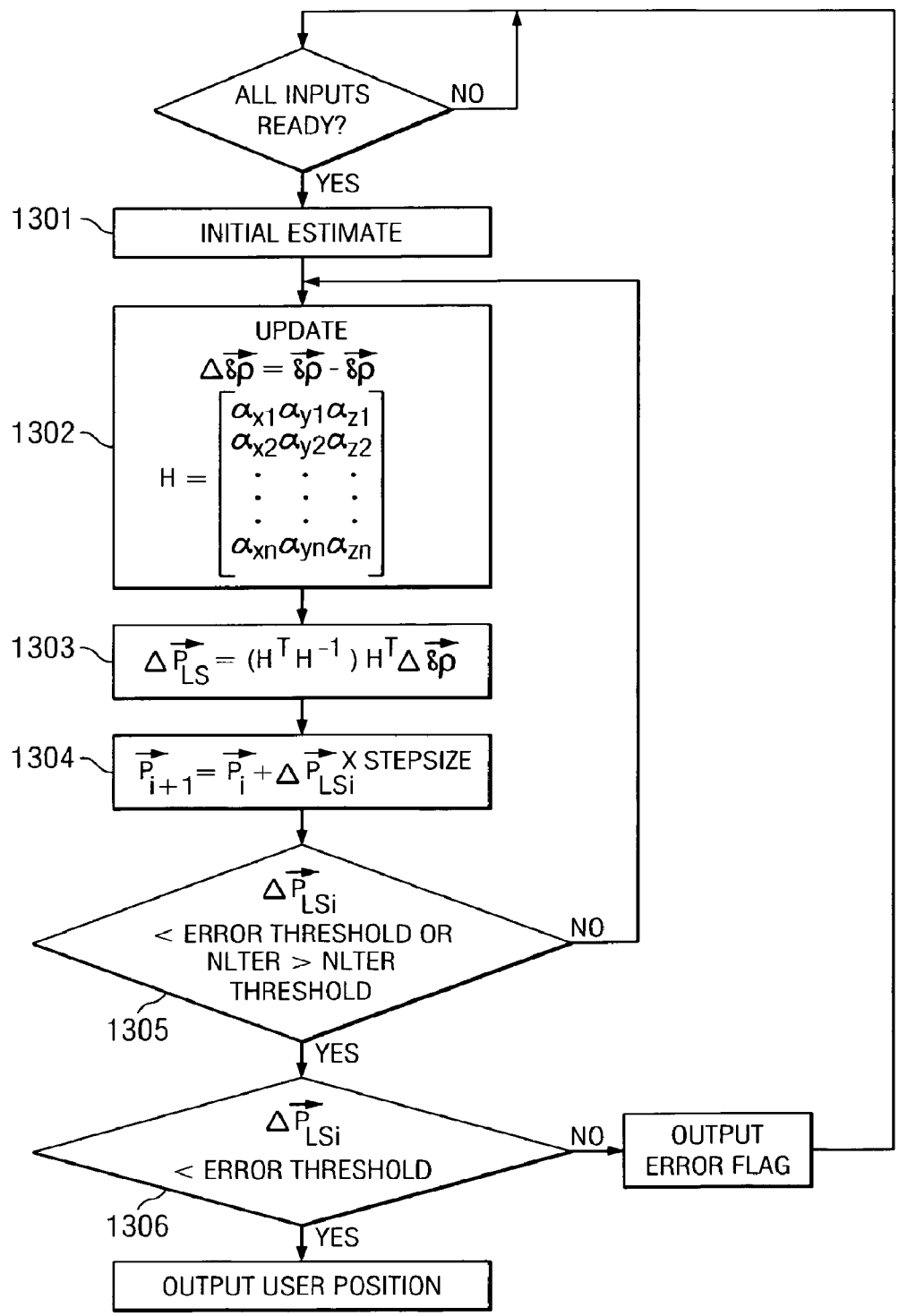
FIG. 13 shows a Newton-Raphson filter method flow diagram. Inputs: (5 TX positions relative delays).
Figure 14:
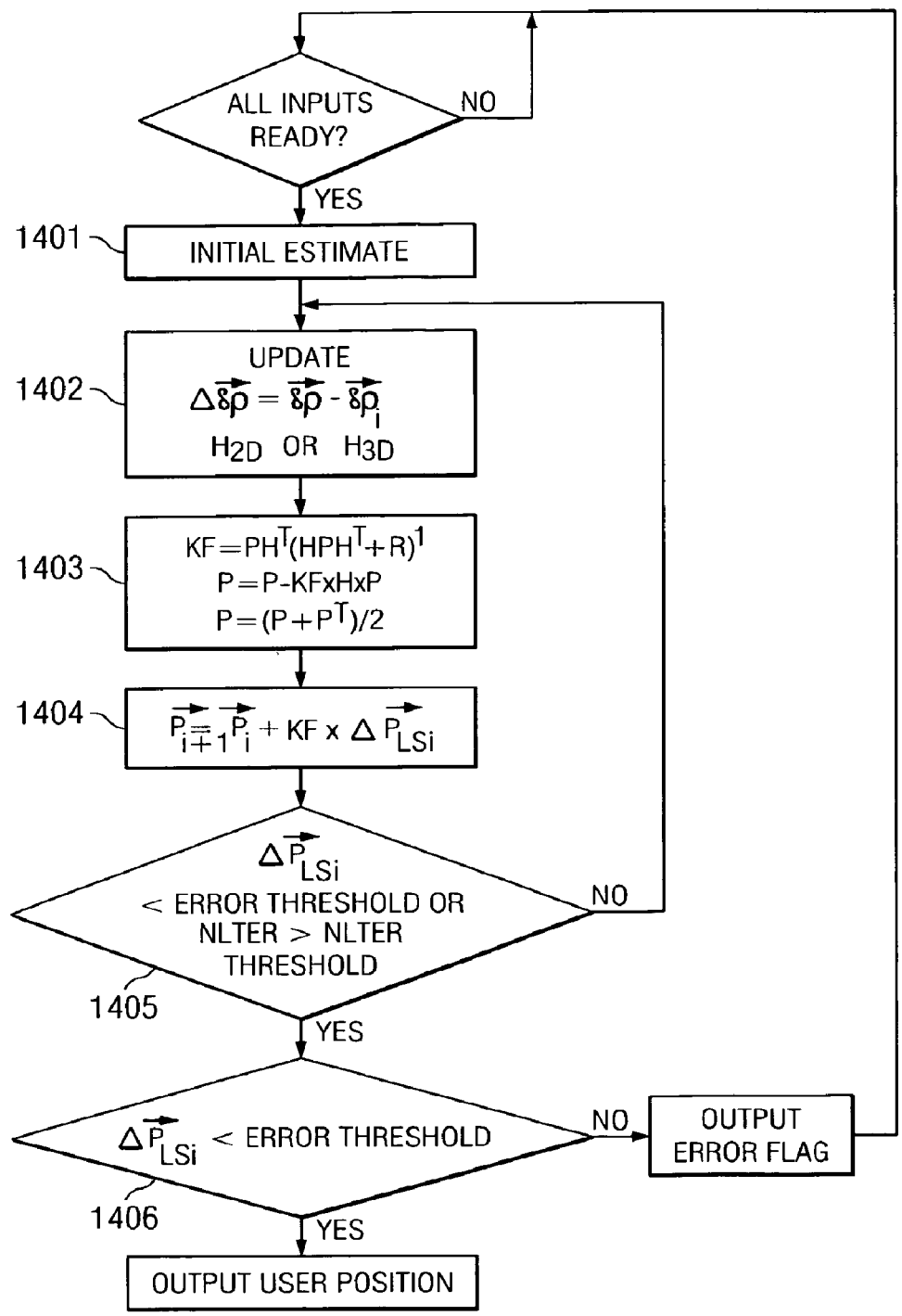
FIG. 14 shows an Extended Kalman Filter method flow diagram. Inputs: (5 TX positions relative delays).

Some details of the Newton-Raphson and Extended Kalman filter methods are shown in FIGS. 13 and 14. Both of these algorithms are well known in the art and are described here only briefly. The Newton-Raphson algorithm of FIG. 13 is typically used in the more basic linearization methodologies, whereas the Extended Kalman filter of FIG. 14 is modified from the standard Kalman approach to better handle the parametric nonlinearities inherent in the location-computation process. In an Extended Kalman filter, the functions of the state of the system need not be linear. In FIG. 13, an initial estimate for the solution to the equations is given (1301), and then the next iteration computed by solving for the zeros of the tangents of the functions (1302, 1303), the result of which is added to the initial estimate (1304). If the solutions are within the error threshold (1305, 1306), the result outputs the user position. In FIG. 14, the Extended Kalman filter is shown. A Kalman filter is an efficient recursive algorithm for determining the state of a dynamic system using incomplete information subject to noise. An initial estimate 1401 is updated with respect to the state as well as the covariance matrix, which is an indication of the accuracy of the estimate. The covariance matrix is based on a matrix of partial derivatives of the state functions and has the effect of linearizing the functions around the current estimate. The predict step of the algorithm (1403) is used to predict an estimate of the current state based on the previous state (1404). These steps are iterated until the estimate falls within the error threshold (1405, 1406). An additional, improved technique for solving the receiver's location from the group of pseudorange values is the use of adaptive, weighted averaging non-linear filters. These processing routines or methods have been derived from a fundamental timekeeping algorithm pioneered by David W. Allan of NIST for use in averaging the outputs of multiple atomic clocks to develop a weighted ensemble average for keeping U.S. and International standard time; a version of this technique is already being employed in the EQUATE oscillator ensemble mentioned previously. Similarly, the pseudorange values as a set can be manipulated via a modified form of the original Allan algorithm to minimize overall errors and reduce dependencies on high-variance (noisy) or biased parameters or pseudoranges where some redundancy exists in the data set.

The overall performance of TPS is, as with all radiolocation systems, determined by the precision (resolution) of the transmitter and receiver electronics (e.g., number of bits, sampling rates, internal clock frequency errors, and jitter) as well as systematic properties including transmitter clock errors, uncertainties in propagation-time predictions, and noise backgrounds. The basic positioning precision is dependent on the phase resolution of the receiver carrier-phase loop, which is from 0.35° down to 0.09° (10 to 12 bits). Expected noise variances in the system (assuming good signal-to-noise conditions and ~1 second averaging times) are in the range of 1° down to 0.3°. Near 100 kHz, this represents a 2-D locating precision of about 10 down to 3 meters; at 3.3 MHz, this yields an equivalent X-Y locating precision of roughly 0.3 to 0.1 meters, depending on signal strengths. Laboratory measurements of the hardware have confirmed this number. A major benefit of the TPS signal format is the ability to achieve a rapid position solution. From initialization, the time-to-first-fix (TTFF) is designed to be in seconds, rather than minutes, as is often the case with GPS.

As with GPS, multipath is a major limiting factor (and by nature the least well-defined error source) in the overall accuracy for field applications. In the 100-kHz LF and 3.3-MHz HF groundwave versions, the wavelengths are so long that multipath per se is not a real problem, though delayed skywave signals can be; in the LOS version (e.g., at ~2.45-GHz), the problems are similar to those in GPS (~1.575 GHz) and require corresponding but familiar solutions. Interestingly, the effects of skywave signal contamination over shorter baselines (perhaps up to 1500 km) for the LF version of TPS are similar to those of multipath in conventional LOS systems, in that a second, indirect signal (the skywave component) often arrives well within the period of a chip, thus distorting the ideally triangular correlation waveform and obscuring the true peak, which indicates the relative time-of-arrival of the main signal component. The measured peak time (and thus the calculated path length, is either advanced (positive range error) or retarded in time (negative range error) compared with the actual, depending on whether the effective multipath is essentially additive (retarded) or subtractive (advanced). Several techniques to minimize the effect of second-path (skywave) signals, adapted from GPS signal processing, have proven effective in simulations at LF. However, at LF skywave signals can, at larger distances, actually precede the groundwave, which can also be significantly weaker; thus, the usual GPS multipath solutions, which assume the secondary wave arrives later, often do not work effectively for skywave discrimination. One useful methodology is to employ a short-pulse correlation waveform in lieu of the conventional rectangular waveform corresponding to the binary PN code (see FIG. 22). Since the typical skywave signals near 100 kHz arrive roughly $\geq 60$ μs behind the ground-waves (up to distances of about 1000 km), then for a TPS chip time of 200 μs, a correlator waveform with active pulses of ⅛ chip period will largely ignore the later-arriving skywave signals. Obviously, a second correlator tuned to the skywave signals can be operated in parallel and is useful to detect those signals (whether earlier or later) concurrently. At HF, however, due to the much shorter basic range of the groundwave signals and the typically much shorter chip periods, the nearly vertically incident skywave components usually arrive many ($\geq 40$) chip times later and are thus very efficiently rejected by a relatively conventional correlator structure. Of course, the second correlator for each code channel is still useful for timing the skywave component, as will be discussed shortly.

An additional aspect of the TPS concept lies in the use of all three typical modes of RF signal propagation—ground wave, sky wave, and direct wave, based on the frequency and antenna configuration. For instance, as in the previous examples, the usual mode of operation is groundwave for the 100-kHz and 3.3-MHz systems, but skywave components can also be utilized for radiolocation measurements, although with generally lower accuracy. As a major benefit of skywave operation, the vertical elevation of a TPS receiver can be determined to a reasonable precision, since the angles of arrival of the skywave components will often approach 45 degrees (the general ranges of angles in GPS) and thus permit a vertical dilution-of-precision (VDOP) is around 2-3, about the same as with GPS, since the earth's ionosphere is not overly stable in its effective height and reflection characteristics versus frequency. This is a function of time of day, solar illumination levels, season, solar storms, and the like. To achieve good vertical accuracy, it is desirable to incorporate one or more differential measurement receivers in the vicinity of the user's unit to provide ongoing ionospheric delay data between the TPS transmitters and the target area. Furthermore, in the HF case the "vertical" TPS measurements may not necessarily be conducted at the nominal groundwave frequency due to the highly variable absorption characteristics of the ionosphere versus frequency. If the ionosphere is severely absorptive at the nominal frequency of the groundwave, the skywave signal may well utilize a significantly different frequency to achieve reasonable signal strengths at the TPS receiving site. Although at LF (~100 kHz) the ionosphere does not have significant loss during daylight hours (perhaps ~25 dB), at lower HF-range frequencies the daytime losses can be extremely large (>70 dB). In that case, a higher frequency (usually between 3 and 12 MHz) is often required for successful daytime skywave HF TPS operation. This, of course, requires a second-frequency, agile TPS transmitter and receiver set. In practice, the secondary frequency would usually be specified within the data-stream sent via the main ground-wave signals, decoded at the main TPS frequency by the area differential (DTPS) receivers, and used to set the receive frequencies for the skywave channels.

In the case of much higher-frequency operation (>80 MHz), where the RF propagation is essentially line-of-sight, the TPS system can be used to provide accurate ranging information for airborne platforms, including missiles, fixed-wing, and rotary-wing types, and for general on-ground use from higher elevations such as hills or towers. For aircraft, this implementation would typically embody multiple ground-mounted (slightly elevated) TPS transmitters, with the corresponding receivers on the airborne platforms. As an example, the frequency band of 2400-2483.5 MHz (the license-free ISM "2.45-GHz" band) could be utilized in a single-band mode with a nominal center frequency of 2440 MHz and a per-phase (I/Q) spread-spectrum chipping rate of 40 Mb/s. These figures would provide a carrier-to-chipping rate ratio of 61, which is very workable in terms of obtaining unambiguous ranging (no carrier-cycle ambiguities as in GPS). The corresponding chip time of 25 ns would correspond to an effective resolution of about 1.25 ft (for 0.1 chip with OQPSK-type modulation) or several times better with averaging. However, a typical preferred TPS system implementation in this band, along the lines of the configuration described in U.S. Pat. No. 6,556,942 (issued Apr. 29, 2003 to one of the present inventors), for reasons to be explained shortly, would use two carrier frequencies, for example at 2409.165 and 2475.66 MHz, each with I/Q quadrature chipping modulation rates of 5.115 Mb/s. Both TPS carriers are precisely phase and frequency locked to the common chip-rate clock source, which here is presumed to be precisely 10.23 MHz, the same as in GPS. The resulting effective chip times (including the offset I and Q chip-stream modulation) would thus be ~97.75 ns; for a nominal resolution of 0.03 chip, the equivalent distance (delay) would be ~0.91 m or 3 ft (about 3 ns). Of course, much higher resolution can be obtained via the use of carrier-phase ranging in addition to the chip-based correlation, since like GPS the TPS signals are specifically designed to have tightly defined carrier and chip transitions which are phase-synchronous. As long as the main chip correlator in the TPS receiver can successfully lock within a reasonably small fraction of a chip (i.e., 0.05 to 0.01), then if the ratio of the carrier frequency to the chipping rate is no less than the lock as a fraction of a chip, then the carrier phase can be unambiguously determined from the signal [unlike in GPS, where the carrier interval is only $\frac{1}{1540}$ of the chip time (for the C/A code), causing integer carrier-cycle ambiguities in the code correlator-derived pseudorange values]. Here, in the LOS TPS example, the chip-to-carrier period ratio $t_c \div t_{chip} = 5.115/2409.165 = \frac{1}{471}$, which is clearly still too small to be workable. However, if both carrier frequencies are (after amplification) processed by mixing in the TPS receiver to derive a synchronous difference-frequency signal $\Delta f = 66.495$ MHz (with a wavelength of ~4.5116 m), then the chip-to-difference period ratio is now $t_{chip} \div t_\Delta = 5.115/66.495 = \frac{1}{13}$, which is quite easily handled without a risk of difference-cycle ambiguity. An additional advantage to the two-carrier system, like GPS with both L1 (1575.42 MHz) and L2 (1227.6 MHz) frequencies, is that the propagation group delay through typical dispersive dielectric media (such as the ionosphere or plasmas within thunderstorm cells) is approximately inversely proportional to the square of the carrier frequency. Thus, corrections can be made for the typical above case of $f_1 = 2409.165$ and $f_2 = 2475.66$ MHz; as long as there is no integer-cycle ambiguity, as is the case here, the incremental delay ratio can be determined rather accurately—1.05596 . . . , which leads to the equation for $\rho$, the corrected code pseudorange measurement through such dispersive media:

$$\rho = [f_1^2 \div (f_1^2 - f_2^2)]\rho_1 - [f_2^2 \div (f_1^2 - f_2^2)]\rho_2, \quad (9)$$

where $f_1$ and $f_2$ are the two carrier frequencies and $\rho_1$ and $\rho_2$ are the corresponding pseudorange measurements. This equation can largely compensate for the frequency-dependent signal delays as the properties of the medium change with time, temperature, humidity, and the like. This general effect also applies to ground-waves passing over the earth and is thus a differential correction technique which can appreciably improve the accuracy of the signal group-delay measurements through any dispersive time-varying media. A similar equation may be utilized successfully to correct the carrier-phase pseudorange (phase-delay) measurements, although in some media the carrier pseudorange error can be greater than the wavelengths involved, thus rendering ambiguity resolution difficult without other techniques such as spatially differential operation. (Of course, normal air is essentially a non-dispersive medium and thus does not exhibit this frequency-dependent behavior). For the LF TPS case, the nominal frequencies of 85 and 115 kHz can be employed with this same correction methodology (although using a much-reduced correction factor) to obtain more precise estimates of the ground-wave signal delays.

Figure 15:
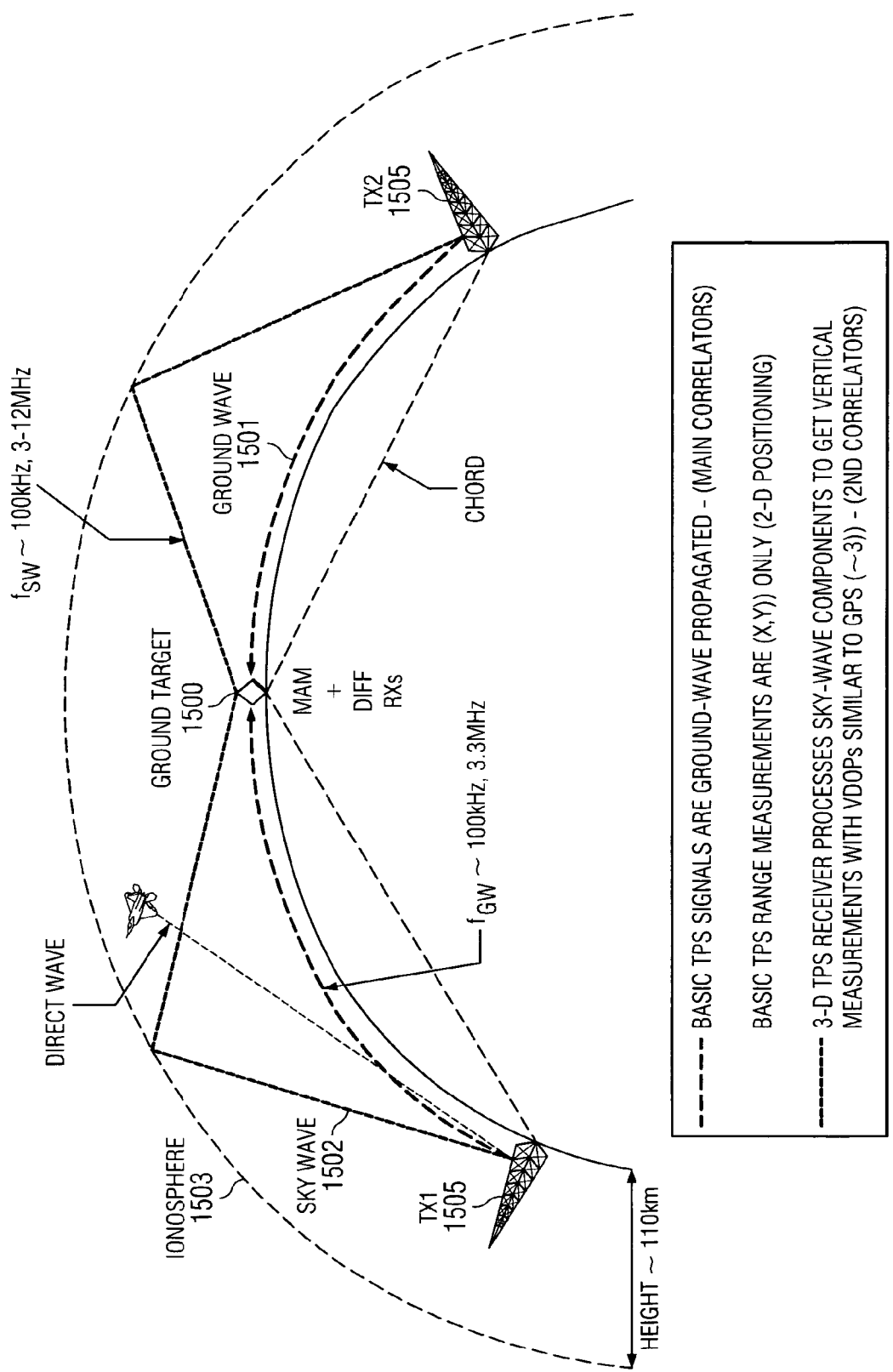
FIG. 15 shows 3-D TPS signal propagation.

A more detailed pictorial drawing of the signal propagation paths is shown in FIG. 15, where both groundwave 1501 and skywave 1503 signals reflected by the ionosphere 1503 are indicated for both LF (nominal 100-kHz) and HF (approximately 3-12 MHz) versions of TPS. The line-of-sight (LOS, in black) wave for UHF and above is also shown. Note that in the desired target area 1500, in addition to the main receiver, the one or more differential receivers are deployed to assist in obtaining more accurate horizontal and vertical location values. The horizontal fix is improved much as in DGPS systems, but the vertical estimation is more complex. To resolve the vertical elevation, the transit times of the ground waves are first measured and subsequently corrected by the local differential receiver data. The TPS transmitter positions 1505 are broadcast, along with precise time; the TPS receiver, in an analogous fashion to GPS receivers, acquires the respective signals in multiple primary correlators/Costas loops, extracts the data streams, and solves the multivariate problem to obtain the common solution (the receiver's location and time values). Next, the secondary correlators lock to the later-arriving skywave signal and decode its delay mean and variance.

The 3-D LF/HF TPS receiver, shown in FIG. 16, operates basically as follows:

The main correlators in each (code) channel 1601 lock onto the ground-wave signals (the first arrivals).

The output of the main correlator is then used to cancel the main signal at input to the channel secondary correlators 1602, which are typically operated at higher gain (roughly 10-50 dB) to recover the mean timing of the weaker sky-wave signal components.

An initial "planar" position solution (2-D) is derived from the main correlators and corresponding phase detectors in the respective code channels.

Next, the 2-D position solution (horizontal position values) from the secondary correlators/phase detectors is forced to coincide with main values; then, the effective ionospheric height is computed (1603).

Finally, the height of the TPS "3-D" receiver is calculated from the differential (SW-GW) delay figure, with appropriate signal-dependent averaging. Thus, a full 3-D solution can be obtained from the transmitted TPS signals. Almost invariably, the accuracy in the vertical plane is not as good as in the horizontal, but since in the prior art for ground-wave radiolocation systems there is no vertical position solution at all, this is thus a clear advantage of the instant invention. The use of local-area differential TPS receivers (as "Diff. RXs" near the "Main" in FIG. 15) permits much more accurate estimations of the ionospheric signals' delays and thus facilitates much more accurate vertical TPS measurements. This is particularly true near sunrise and sunset, where the effective height of the ionosphere is changing the fastest; thus, the sampling rates of the differential receivers will generally be increased at those times of day. Near noon and midnight, they can usually be slower.

Figure 17:
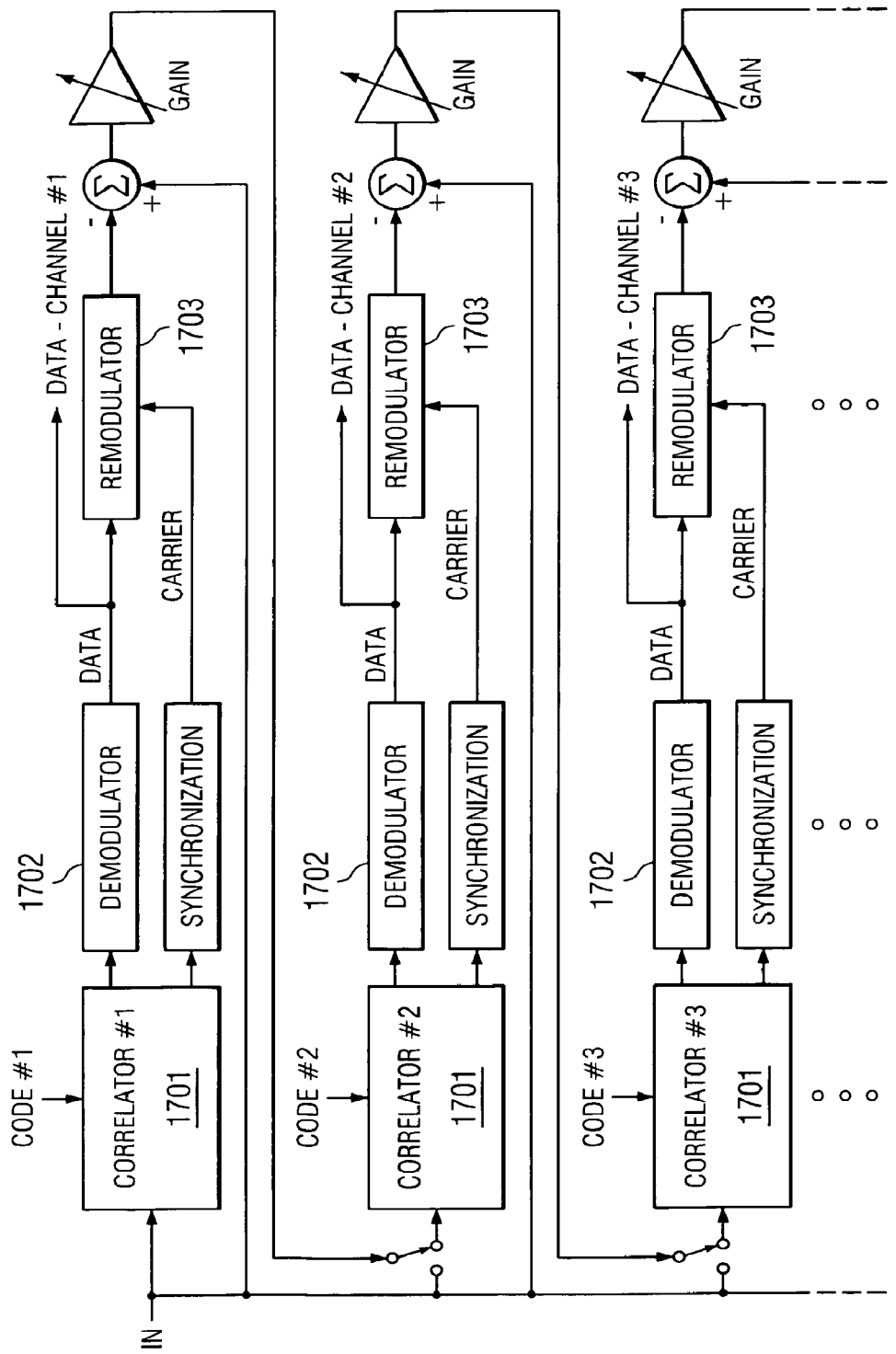
FIG. 17 shows a block diagram of a TPS interference-canceling receiver.

The interference-cancelling (I-C) TPS receiver shown in FIG. 17 operates with the following sequence of signal-processing steps:

Initialize the correlators 1701 with known codes and modulation parameters.

Run all correlators in parallel; select codes in the order of descending signal amplitudes.

Switch the receiver configuration to cascade; take the largest signal/code (#1), detect, remodulate, & subtract from the overall sum to obtain residue #1 (1702).

Subtract the second largest remodulated signal/code from residue #1 to get residue #2 (1703).

Repeat the process until the last residue (#R) provides only a marginal I-C improvement.

All small signals remaining in the last residue may be parallel-correlated/detected if desired for speed, or processed in cascade for maximum low-level sensitivity.

The entire I-C process may be repeated as often as needed, based on signal level changes.

The parallel I-C receiver architecture is ideal for implementation using modern, high-density FPGAs.

The I-C processing greatly mitigates the usual CDMA near-far problems and should perform very well in the usual near-stationary TPS signal environment.

The I-C processing will also facilitate the efficient use of the on-frequency "vertical" (skywave) signals for 3-D TPS measurements in the LF range and is useful for minimizing the deleterious effects of the skywave signals in both LF and HF ranges by at least partial cancellation of the resulting interference in the CDMA TPS signal environment.

Figure 18:
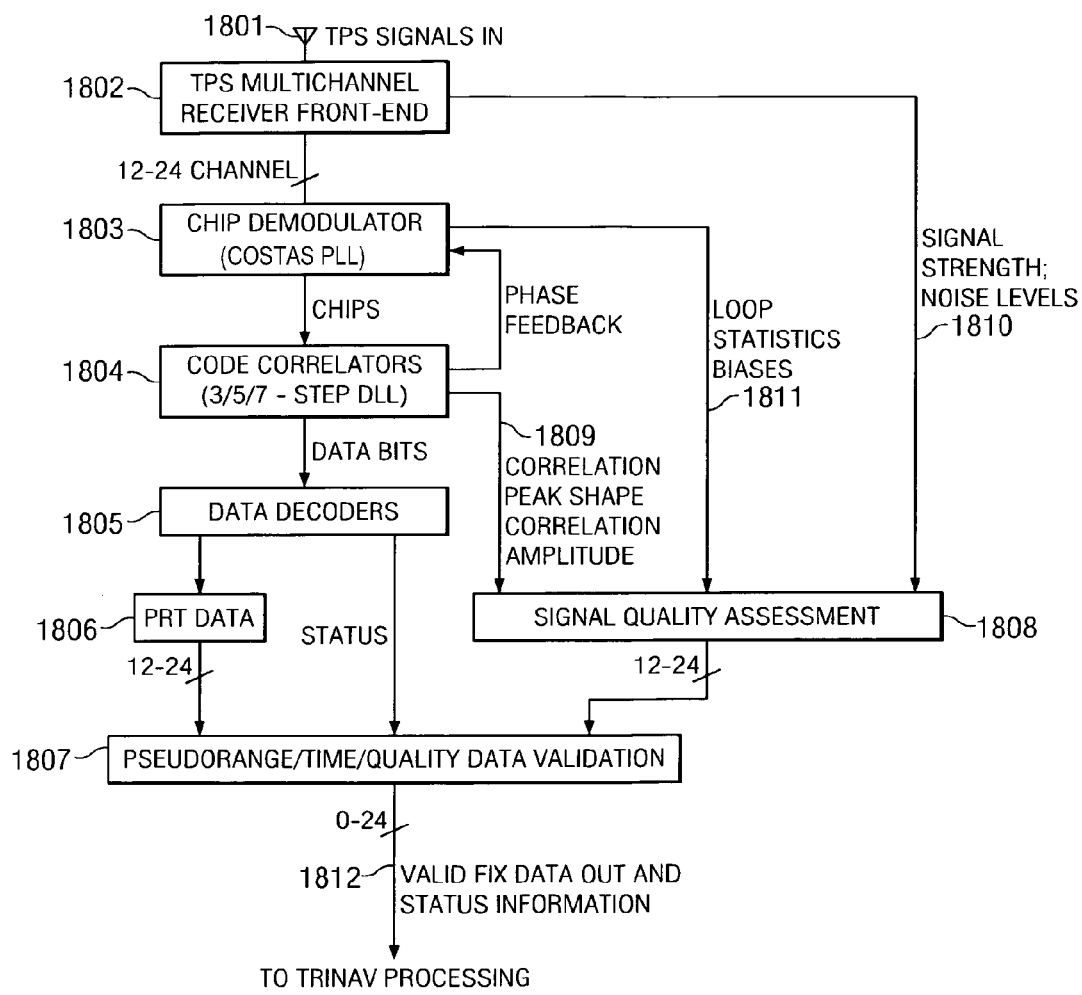
FIG. 18 shows a flow chart of the basic operation of the TPS receiver unit.

A flow chart describing the basic operation of the multi-channel LF TPS receiver is shown in FIG. 18. (Receivers for the other TPS bands have very similar features and functions and will not be further elaborated on here). Here, the multiple CDMA TPS signals arrive at the antenna 1801 and are fed to the very wide dynamic-range receiver front end 1802. The front-end is typically equipped with highly selective band-pass filters to reject signals outside the desired 80-120 kHz band. In addition, for the LF and HF bands, the front-end is also equipped with multistage noise-limiter and/or noise-blanker stages to minimize the impact of incoming impulse noise from lightning, static discharges, power-line corona and arcing, and the like. The multistage noise-limiters additionally exhibit progressively narrower bandwidths and decreasing thresholds as the signal proceeds from the RF stage into the IF system to provide the most effective noise rejection under all receiving conditions. The receiver's AGC system employs a very wide range of IF gain control, preceded by a wide-range RF AGC function which also includes a front-end attenuator to properly handle even very strong input signals. Depending on the specific implementation, the typical TPS receiver may have from 12 to 24 processing channels, e.g., where there are 6 TPS transmitters to be tracked, each with up to four spread-spectrum signals (i.e., ABCD). Obviously, for the 3-D TPS receiver, there will typically be at least two correlator channels per signal per transmitter (code), one for the groundwave signal and one (or more) for the skywave component(s). At HF and in the LOS unit, the channel count will also vary based on the specifics of the application. Once the TPS signals have been appropriately amplified, gain-leveled, and limited, the spread-spectrum signals are demodulated as chips in a suitable Costas-type (normal or extended) phase-locked loop (PLL) at 1803 and sent on to the code correlators at 1804. Here, the incoming TPS signals are typically processed by a threshold comparator, preferably with a noise-adaptive deadband, to square the waveforms up without overly boosting incoming noise components, as in the plot 2200 of FIG. 22. Next, the local replica of the pseudorandom code (usually of either the Gold or Kasami families) is effectively time-differentiated to produce a series of narrow doublet pulses (2201) corresponding to the transitions of the standard code as in 2200. For a positive transition in 2200, the doublet version appears as at 2202; the negative code transition produces a doublet form as at 2203. By programming the durations of the doublets to considerably less than the full chip period, the sensitivity to delayed (or advanced) pulses, arriving at other than the time of the main desired (ground-wave) signal, is greatly reduced. To assist in the assessment of the received signal quality (including skywave and multipath contamination), the code correlators are usually implemented as delay-locked loop (DLLs), but with selectable delay steps. Whereas the typical DLL correlator in wide use employs 3 code delays (early, punctual, and late [E, P, L]) separated by a chip down to about 0.1 chip in phase, the DLL in 1804 may use 5 or even 7 discrete steps to better assess the precise shape of the ideally triangular correlation-versus-delay peak and thus estimate the timing of the undesired skywave and/or multipath signal components.

From the code correlators the data bits then are sent to the data-stream decoder 1805 to extract the TPS TX locations, system time, health, status bits, correction factors, and other pertinent information; these are stripped out and sent to the pseudorange/time/quality (PTQ) data-validation stage 1807. Meanwhile, the pseudoranges and time values (PRT) from the respective TPS transmitters are processed at 1806 to provide the tentative TPS navigation solution. In addition, the status of the various TPS receiver-system signals is assimilated in the Signal Quality Assessment block 1808. These signals include, but are not necessarily limited to, the incoming signal strength (1810), noise-limiting action, correlation peak shape and amplitude (1809), and receiver PLL feedback error signal (1811) statistics (e.g., variance and mean) as well as any static loop biases, which are often indicative of jamming or severe interference. Once all the associated data is analyzed in the PTQ block 1807, the verified TPS fixes, plus the individual pseudoranges and status information, is sent on to the main TRINAV processing unit at shown at 1812.

Figure 19:
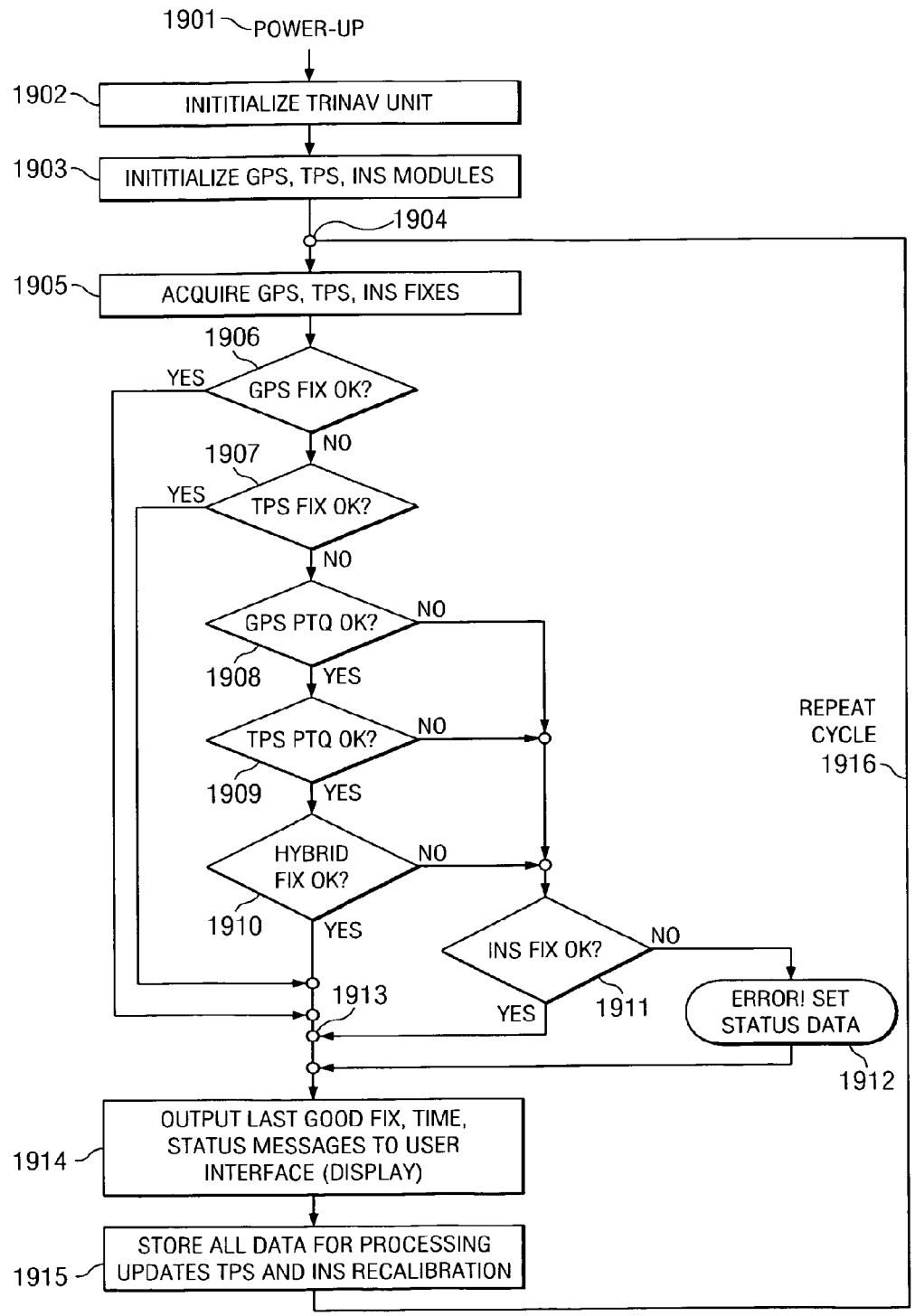
FIG. 19 shows a flow chart of the navigation processing of the overall TRINAV user unit.

An overall flow chart for the navigational operation of the main TRINAV unit is shown in FIG. 19.

At power-up (1901), the TRINAV unit begins self-initialization (1902) and sends internal commands to initialize the semi-independent GPS, TPS, and INS modules as well (1903). At 1904, the main operational loop starts by requesting that the respective GPS, TPS, and INS units begin acquiring their individual, independent fixes (1905). Normally the GPS receiver takes from 30 seconds to several minutes to obtain its first fix and the INS may take somewhat longer to initialize and orient itself before producing stable fix data, so generally the TPS unit provides the initial TRINAV system fix. In addition, the TPS subsystem can also assist in the TRINAV orientation process, assisting the compass and inclinometer is establishing the 3 orthogonal axial references. Next, as the GPS fixes are acquired, more cross-comparisons between the GPS, TPS, and INS data can be performed. In normal, ongoing loop operation, the basic signal-integrity tests begin at 1906, where the GPS fix is tested for sufficiency, consistency, stability, and overall validity. Obviously, if a given GPS satellite transmits a bad health message, the fix from that source (both pseudorange and time) will be excluded from the composite GPS solution presented to TRINAV; a corresponding action will also occur for TPS. If, however, there are still a sufficient number of good satellite signals to produce a high-quality fix, then the decision from block 1906 will be "Yes" and TRINAV will proceed to output the GPS fix as its final solution. However, if after the test at 1906 the result is "No", TRINAV will then seek the TPS fix data. At 1907 a similar test occurs; if TPS is judged good, the fix will be used by TRINAV. If not, then the GPS (1908) and TPS (1909) data are examined together to determine if a hybrid GPS/TPS fix is possible (1910). If a composite fix can be successfully calculated and verified via the associated signal-quality data, then the output of the algorithm uses that. This flow is principally focused on the horizontal-plane (XY) location process, since TPS is often used as a 2-D system due to its typical planar (surface) geometry. For the vertical (Z) dimension, the process is similar except that the TPS fix is not usually included. If the 3-D version of the TPS receiver is present in the TRINAV system, TPS will be incorporated in the vertical-positioning process, though on a weighted basis due to the greater variances for the Z axis in the normal 3-D TPS fix. If GPS and TPS together do not have enough vectors to complete a valid fix, then the TRINAV unit reverts to internal timekeeping and turns to the INS for a temporary location solution (1911). Assuming the INS has been properly initialized and locked, its fix will then be passed on to the output. If not (as determined in block 1911), a navigational-failure error is set (1912) and the unit proceeds through the convergence node 1913 to the output and display block 1914 and the fix and status data are displayed for the user. The unit then stores all data for future processing updates (1915). If the GPS and TPS fixes are deemed good, the block at 1915 also performs recalibration of the TPS propagation-correction (ASF) data and re-calibrates the current fix data for the INS to cancel its own internal drifts. After these actions, the TRINAV navigation cycle repeats (1916). In all cases, the pertinent fix and signal-quality data are always passed on for future updates, performance analysis, and quality-of-service (QoS) assessments within the TRINAV user unit.

Figure 20:
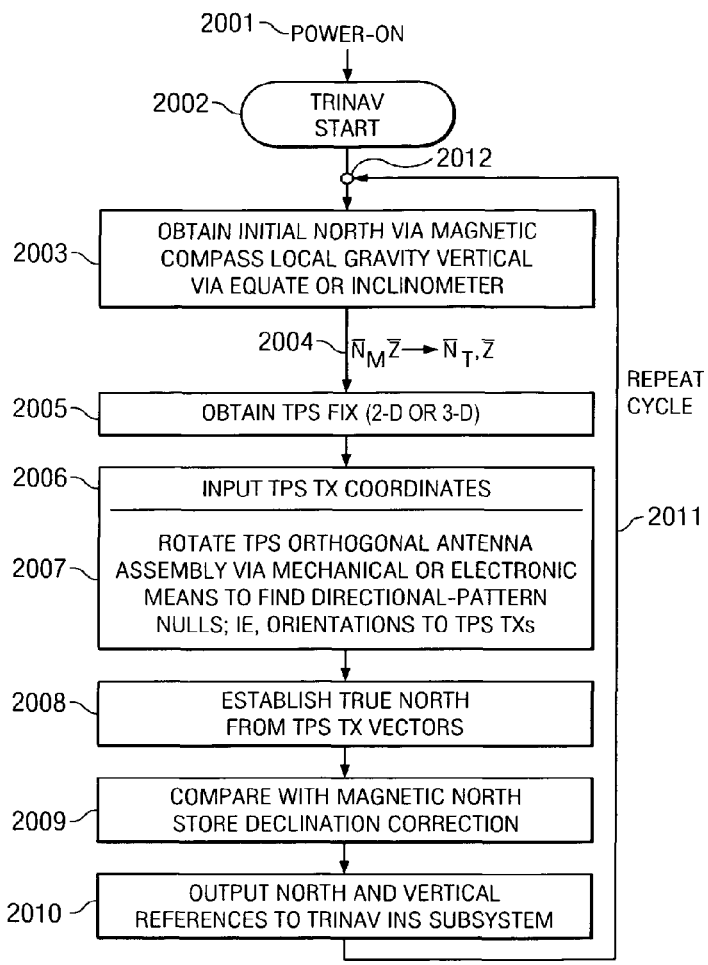
FIG. 20 shows a flow chart for the setup and orientation of the inertial navigation system (INS) component of TRINAV.

The high-level flow diagram for the orientation process for the TRINAV user unit is shown in FIG. 20. After power-up (2001) or a TRINAV restart or reorientation command (2002), the orientation-setup loop begins at 2003, by obtaining an initial magnetic North bearing using the electronic compass and finding the local gravity vertical vector via the EQUATE subsystem or another, integral inclinometer. The initial output vectors are magnetic North and Z (vertical), as shown at 2004. Next, in 2005, the TPS receiver is used to generate a valid TPS (horizontal) fix. Once the individual TPS transmitter coordinates are decoded, they are inputted to the orientation subsystem processing module (2006) and are used to rotate the directional TPS antenna assembly (if so equipped) via either mechanical [possible] or electronic [preferred] means to find the nulls in the directional patterns of the co-phased antenna elements. Then the patterns are rotated until the individual TPS signals are each nulled; the true bearing to each (at the peak) is then 90 degrees from the null (block 2007). Once all the TPS bearings are established, the TRINAV orientation routine calculates the vector for true North (2008) and verifies the pre-stored declination values for the area of operation [if possible] (2009). Of course, if a TPS bearing-fix is not available, then the measured magnetic North, corrected by the stored declination values, is used instead for true North. Finally, the best-available North and vertical vectors are provided as references to the TRINAV INS subsystem (2010). As the application requires, the orientation-calibration cycle repeats (2011) and the routine re-enters the loop at 2012.

Figure 21:
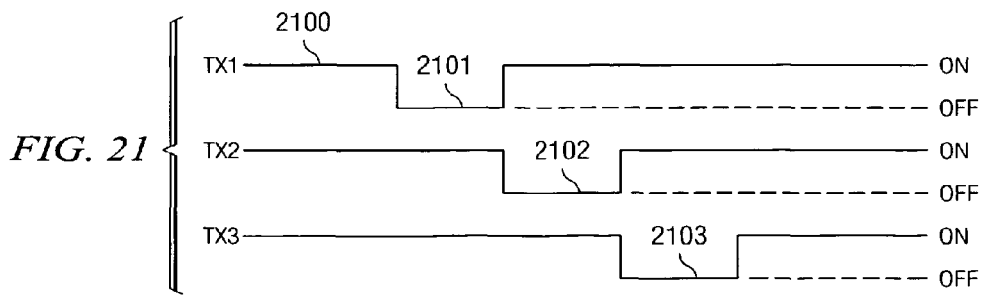
FIG. 21 shows the "on-off" duty cycling of three TPS transmitters to mitigate the normal near-far problem with CDMA systems and expand the operational TPS dynamic range.

FIG. 21 shows details of the time-division ("inverse-pulse") technique to mitigate the near-far problem experienced with CDMA signals of widely varying received amplitudes. In the case of TPS, although in the ideal situation the respective transmitted signals would be of similar magnitudes at the TPS receiver, this is rarely the case. In the worst situation, one can be very near one of the transmitters and much further from the others; as a result, the signal from the nearby TX may be as much as 50-60 dB above the other signals (we exclude the obviously unlikely near-field case). In that situation, the nearby signal will totally dominate the receiver's AGC and may well cause the other TPS signals to be suppressed to the point of being unusable. If, however, we sequentially turn off each transmitter for short periods (but enough to acquire a complete TPS fix with the remaining signals), we can avoid this problem. The local transmitter does not necessarily have to switch completely "off", but instead can simply reduce its output power by 40-50 dB. This will provide an equivalent increase in the TPS system dynamic range by the same 40-50 dB. Lesser reductions increase the sizes of the circles of interference to users near the transmitters but can provide better coverage to those at more reasonable distances. The duty-cycle plots of FIG. 21 show typical "off" or low-power periods for three TPS transmitters (TX1, TX2, and TX3), all in the same general TPS coverage area. Note that the "on" interval represents full-power operation (2100); the "off" or reduced-power intervals are shown as time-staggered for the three rigs at 2101, 2102, and 2103, respectively. The "off" intervals last a full TPS data epoch, long enough to obtain a full TPS fix. If, for instance, TX1 is off, a full TPS solution may be obtained for 4 or more remaining signals. This action permits the TPS receiver to "accumulate" fix data and even provide a solution with stored data to substitute for the unit currently "off". Since the LF TPS data times are so long, the TXs may be considerable distances apart (>100 km) before more elegant timing staggers must be employed to avoid loss of data among the TPS signals. In this large-area case, the relative transmission time staggers (epochs) can be simply increased or alternated (skipping every other epoch) to extend the range to several thousands of miles.

Figure 22:
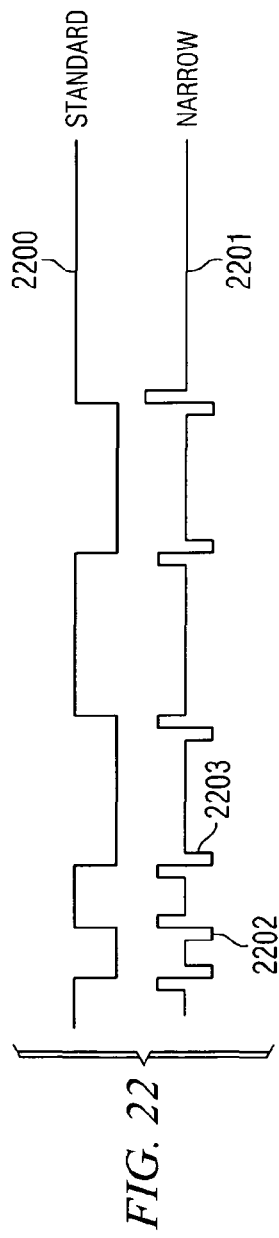
FIG. 22 shows the comparison of standard versus narrow correlator waveforms to improve skywave rejection in the LF TPS receiver.

FIG. 22, as cited earlier, shows both standard and narrow-pulse waveforms as used in the TPS receiver. Further, the incoming signals are often squared up to resemble the logic-level signals of 2200. The narrow-width correlation waveforms, designed to reduce the sensitivity to either delayed or advanced skywave signals, are shown at 2201. The local replica of the pseudorandom code (usually of either the Gold or Kasami families) is effectively time-differentiated to produce a series of narrow doublet pulses (2201) corresponding to the transitions of the standard code at 2200. For a positive transition in 2200, the doublet version appears as at 2202; the negative code transition produces a doublet form as at 2203. By programming the durations of the doublets to considerably less than the full chip period, the sensitivity to delayed (or advanced) pulses, arriving at other than the time of the main desired (groundwave) signal, is greatly reduced.

Figure 23:
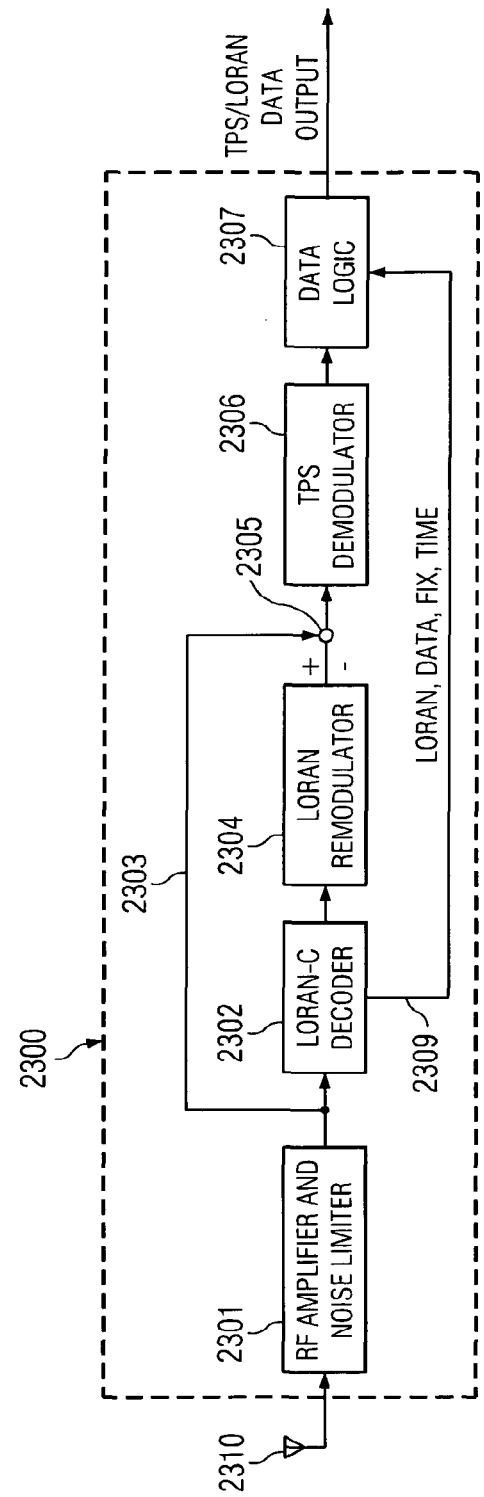
FIG. 23 provides a block diagram of a combined LF TPS/LORAN-C receiver, using the basic interference-canceling principles of the receiver architecture depicted in FIG. 17.

FIG. 23 provides a signal-flow block diagram of a high-performance combined LF TPS/LORAN-C receiver 2300, along the lines of the I-C receiving architecture depicted in FIG. 17 and the associated text. This architecture is not generally required for the basic LORAN-compatible TPS A&B signal configuration, but is very useful for the full ABCD setup, where the TPS C&D signals overlap the LORAN spectrum from 90-110 kHz. The input signal, from antenna 2310, feeds the gain-controlled, high dynamic-range RF amplifier and noise-limiter stage 2301. The LORAN-C decoder channel (2302) is one of several parallel stages; its output feeds LORAN fix data (2309) to the data-concatenation logic block 2307. The LORAN timing data is used to remodulate the LORAN signal in block 2304; its output is subtracted from the main input signal at summer 2305. The output of 2305, with the LORAN signal effectively cancelled (to at least 20-25 dB) is then sent to the TPS demodulator 2306 for extraction of the TPS data and timing.

Figure 24A:
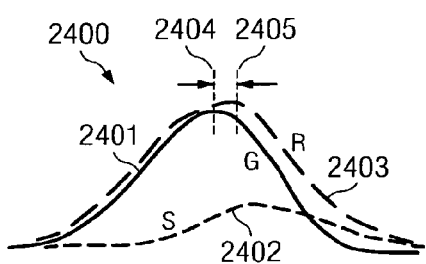
FIG. 24 provides conceptual correlation waveforms in the TPS receiver for reception cases of (a) non-inverted, delayed skywave versus groundwave signals; (b) inverted, delayed skywave; (c) non-inverted, early skywave; and (d) inverted, delayed skywave.
Figure 24B:
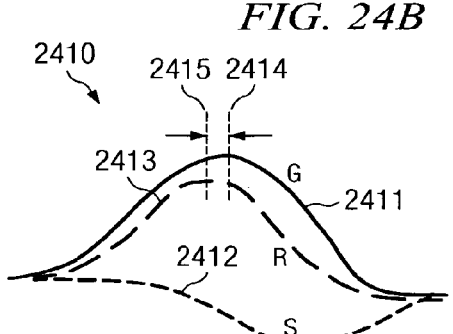
Figure 24C:
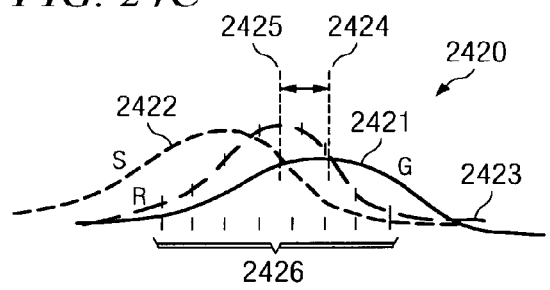
Figure 24D:
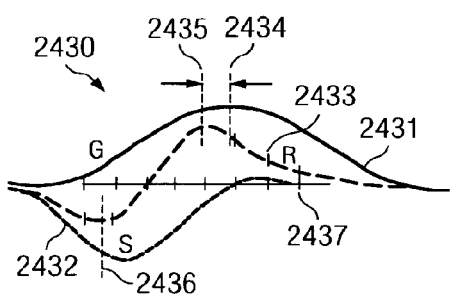

FIG. 24 shows time-domain plots of the correlation waveforms in an LF TPS receiver in four basic scenarios: (a) a groundwave with delayed, non-inverted skywave contamination; (b) the groundwave with a delayed, inverted skywave added in; (c) an early-arriving, non-inverted skywave with a smaller groundwave, typical of long-distance LF reception (>1500 km); and (d)

an early-arriving, inverted skywave with a smaller groundwave component. Since at LF and with relatively low spread-spectrum chipping rates (e.g., a few kHz), skywaves tend to arrive well within a one-chip time window of the groundwave signal. In FIG. 24(a), the composite correlation-versus-time waveform 2400 has a groundwave component [G] 2401 and a smaller, later skywave component [S] 2402. The resultant [R] 2403 has a correlation peak at 2405, which is later than the pure groundwave peak at 2404. The time difference (shown by the right-pointing arrow) reveals that the presence of the skywave effectively increases the delay measurement (2405) over the true groundwave value (2404), resulting in a positive ranging error. In FIG. 24(b), the converse is true (2410); here, the G signal 2411 peaks at 2414; the inverted S signal (2412) causes the resultant R (2413) to peak at 2515, which represents a negative ranging error. Now we examine the early-arriving skywave situation (2420), where in FIG. 24(c) the skywave (2422) is also typically larger than the groundwave component (2421). The resultant (2423) is markedly earlier at its peak (2425) than the groundwave (2424). The timing marks at 2426 depict the 7-step correlator DLL mechanism mentioned previously; it is clear after examination of the figure that the additional points of time resolution permit a much more accurate characterization of the shape of the R curve and thus the accuracy of the main-path delay estimation. The final case (2430) depicted in FIG. 24(d) shows not only the inverted, early S signal (2432) and a smaller G component (2431), but a double-peaked R curve (2433), with the predicted times at 2435 and 2436. Clearly, this last case is very difficult to handle accurately; perhaps the most useful approach is to employ the two-correlator approach of the receiver in FIG. 16 to separate the components as much as possible and thus improve the ranging accuracy in the presence of significant skywave signals. Again, the time marks of 2437 here are even better evidence for the need for better correlator time resolution in estimating actual delays when multipath and skywave contamination is significant.

Figure 25:
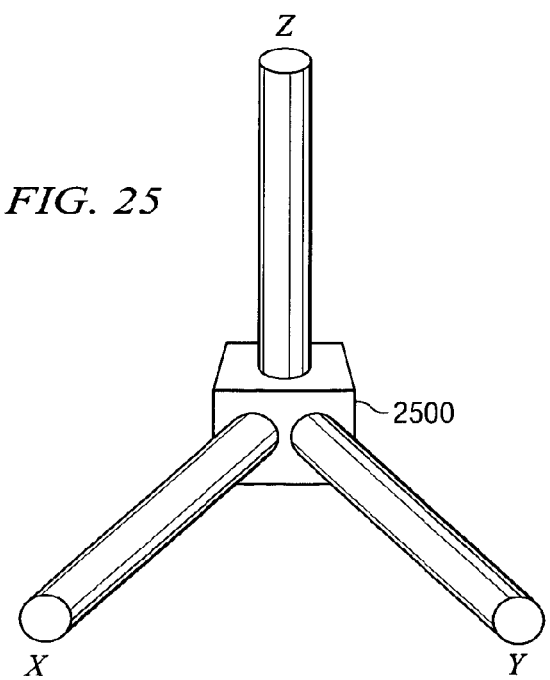
FIG. 25 shows details of a directional, ferrite-rod TPS receiving antenna/flux-gate sensor.

As an additional navigation aid, the TPS receiver element can be equipped with a novel 3-axis magnetic antenna/sensor module, comprised of 3 orthogonally positioned (X,Y, and Z) high-μ ferrite rod-based flux-gate sensors. These sensors utilize the flux-gate drive windings as a set of 3 bi-directional low- to medium-frequency (~50 kHz to 5 MHz) magnetic loopstick antennas. The TPS front-end antenna-interface electronics, once a TPS position fix has been obtained, amplifies, digitizes, and vector-rotates these 3 signals to electronically scan or rotate the antennas; this action is coordinated internally in the TRINAV unit with the multiple TPS spread-spectrum correlators and used to calculate the heading from the receiver to each TPS transmitter. The net result of these computations is a TPS-derived heading for the receiver, essentially independent of local perturbations of the earth's magnetic field. FIG. 25 depicts the basic 3-axis antenna/flux-gate configuration (2500). Sense windings on the three rods (not shown) provide the 3-axis signals coupled from the fields surrounding the device. Additional windings may also be used to excite the rods as in an orthogonal feedback flux-gate configuration. An advantage to this configuration is that the same physical device can serve as both a 3-axis DC flux-gate sensor to measure the earth's local magnetic field and as a directional LF receiving antenna to provide an orientation heading to the various TPS transmitters. This combined structure has significant size and weight advantages over separate, conventional sensor and antenna devices.

System Benefits

The invention, known as TRI•NAV™, is a fault-tolerant, triparte personnel/asset location system combining an advanced low-power Inertial Navigation System (inertial sensor array+custom ORNL electronics) with precision timing, a military-quality GPS unit, and a robust, agile wide-area RF location scheme designated as the Theater Positioning System (TPS). The salient features of the TRI•NAV system are: (1) high-accuracy, reliable navigation in GPS-denied or degraded environments due to jamming or terrain, even during extended outages; (2) completely independent wide-area navigation and tactical messaging via the TPS signals; (3) fast time-to-first-fix (TTFF) figures via TPS; and (4) very high reliability, due to the inherent redundancy, cross-checking, and cross-calibration of the GPS, TPS, INS, and clock elements in the TRI•NAV receiver unit. TRI•NAV employs a specialized Allan-filter based algorithm to reject data from poor-quality navigation sources and produce a composite position output which is better than the best of the sources.

Another advantage of this Allan filter is its ability to significantly reduce the ranging and orientation errors from both white Gaussian and dispersive, random-walk-like processes; typical averaging, Kalman filters, and the like have not been hitherto successful in reducing these latter noise effects. The TRI•NAV user unit can also provide superior short-term and long-term navigation accuracy (both with and without GPS signals) by utilizing the TPS signals for long-term backup to GPS and simultaneously offers the ability to efficiently accommodate a wide range of INS quality levels and thus cost, size and power specs.

The invention can provide greatly demonstrable advantages over GPS-only systems in urban areas, heavily forested regions, and inside most buildings, where the TPS signals can penetrate but GPS cannot, or when GPS signals are subject to jamming or unintentional RF interference. In addition, even in the few situations where the low-frequency terrestrial TPS signals are difficult to receive, such as those heavily shielded against RF signals or principally metallic in construction, in underground areas such as mines, tunnels, and secure facilities, or in the internal areas of large buildings, high-rises, and the like, the INS portion of the invention will continue to provide accurate navigation information, from short to long intervals. This depends on the drift rates—and, thus, cost—of the INS/IMU component of the invention. In addition, the invention permits greatly improved accuracy of the TPS and INS data by providing continual cross-calibration of location and trajectory data with the corresponding GPS/TPS data (assuming, of course, that the GPS/TPS signal qualities are adequate). The system also permits effective automatic initialization and ongoing periodic recalibration of the unit's magnitude constants (sensitivities) and orientation vectors via the use of ancillary magnetometers, inclinometers, and barometers to enhance the setup, stability, and drift characteristics of the INS subsystem, without any user intervention. This recalibration process further permits the effective use of much less costly, lower power INS components for a given level of overall system performance. The concept also provides faster GPS/TPS signal reacquisition times after loss of lock, GPS anti-spoofing detection, and better INS and overall navigation performance assessment. A major advantage to the concept is in the variety of deployment scenarios, to meet a wide range of performance and cost goals. For instance, the invention can typically be deployed on any of 4 levels of sophistication, size, power requirements, and cost, based on the intended application: (1) a very low-cost gyro-less system, which in addition to the standard GPS and TPS receivers, would use for the INS subsystem a simple pair of 2-axis MEMS accelerometers, orthogonally mounted, augmented with a modest-cost flux-gate compass and the inherent inclinometer obtained from the 2 accelerometer signal pairs; (2) a next-higher-grade system, incorporating all the above INS components plus a trio of MEMS gyros, which would augment the flux-gate compass and the inherent inclinometer; alternatively, the EQUATE quartz-oscillator ensemble could be employed as a medium-grade 6-axis velocity sensor to substitute for the individual trio of accelerometers gyros; and (3) a still higher-grade system, incorporating all the above INS components but with a trio of higher-quality MEMS gyros (drifts <<1 deg/min, which would be augmented and recalibrated by the flux-gate compass and the inherent inclinometer obtained from the 2 accelerometer signal pairs; and (4) a top-grade system, incorporating all the above INS components but using a trio of tactical- or full navigation-grade gyros (MEMS or optical) with drifts <<0.1 deg/hr, which would be augmented and recalibrated/initialized by the flux-gate compass and the inherent inclinometer obtained from the 2 accelerometer signal pairs. The use of typical good quality flux-gate magnetometers can provide a north heading accuracy of about ±1°; assuming a reasonably known magnetic environment (not much ferrous metal nearby) and using the inclinometer function available from the 2 orthogonal accelerometers, within the system context, even typical automotive-grade MEMS gyros (e.g., the Analog Devices ADXRS150 with specified drift of 70°/hr or ~1.2°/min) can be held to orientation errors of roughly ±1° over time, which is more than adequate for most personnel and vehicular applications. All 5 configurations of the invention just described could also use the accelerometers or gyros (if adequately precise and stable) for accurate north finding if sufficient time is available (~20-30 min). In addition, the use of magnetic-north vector trajectory tracking can be used in conjunction with successive GPS/TPS fixes to back-calibrate the magnetic compass to true north and provide automatic magnetic declination corrections in the field.

An embodiment of the invention can also be included in a kit-of-parts. The kit-of-parts can include some, or all, of the components that an embodiment of the invention includes. The kit-of-parts can be an in-the-field retrofit kit-of-parts to improve existing systems that are capable of incorporating an embodiment of the invention. The kit-of-parts can include software, firmware and/or hardware for carrying out an embodiment of the invention. The kit-of-parts can also contain instructions for practicing an embodiment of the invention. Unless otherwise specified, the components, software, firmware, hardware and/or instructions of the kit-of-parts can be the same as those used in an embodiment of the invention.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency is intended to mean frequencies less than or equal to approximately 300 GHz as well as the infrared spectrum.

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

CONCLUSION

The invention has the potential to become a useful extension to GPS-only navigation to improve radiolocation performance and reliability in adverse RF environments where GPS reception is impaired or unavailable. The use of programmable SDR-based designs permits the rapid, adaptable re-tuning of hardware to a wide range of operational frequencies to accommodate operational needs. Although the basic ground-based form of TPS provides only 2-D location information, the system can be deployed with elevated transmitters to obtain a vertical position as well. Further, a 3-D form of TPS also utilizes ionospheric reflections (up through HF) to assist in driving an additional vertical fix. The integration of modern GPS, TPS, and cost-effective INS modules, coupled with a new paradigm in low-power, high-stability timebase technology (EQUATE) can provide to U.S. military, emergency, and law-enforcement personnel a new level of dynamic locating-system accuracy, reliability, and availability, especially in adverse reception environments.

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein. Agents which are both chemically and physiologically related may be substituted for the agents described herein where the same or similar results would be achieved.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1 *Bandwidth-Efficient Digital Modulation with Application to Deep Space Communications*, Marvin K. Simon, John Wiley & Sons, 2003, pp. 125-185.
2 *Spread Spectrum Systems with Commercial Applications, 3rd Edition*, Robert C. Dixon, John Wiley & Sons, Inc., 1994, pp. 18-32, 85-112, 500-503.
3 *Understanding GPS Principles and Applications*, Elliott D. Kaplan, editor, Artech House Publishers, 1996.
4 *Global Positioning Systems, Inertial Navigation, and Integration*, M. Grewal, L. Weill, and A. Andrews, John Wiley & Sons, 2001.
5 *Streaming SIMD Extensions—Inverse of 4×4 Matrix, Intel*, AP-926, Order Number: 245043-001, March 1999.
6 *Sigma Sigma-Point Kalman Filters for Point Kalman Filters for Probabilistic Inference in Probabilistic Inference in Dynamic State Dynamic State-Space Model*, R. Merwe, E. Wan, Workshop on Advances in Machine Learning, Montreal, Canada, June 2003.
7 *Learning from Data with Localized Regression and Differential Evolution*, Mark A. Buckner, Ph.D. Dissertation, University of Tennessee Knoxville, May 2003.

What is claimed is:

1. A method comprising:
providing a Global Positioning System fix having a plurality of tracking parameters by a Global Positioning System receiver;
providing a Theater Positioning System fix by a Theater Positioning System receiver;
monitoring the plurality of tracking parameters for predetermined conditions;
and, when the predetermined conditions are met, sending a notifying signal and switching to the Theater Positioning System fix as a primary fix.

2. The method of claim 1, further comprising:
adjusting the Theater Positioning System fix based on the Global Positioning System fix.

3. The method of claim 1, wherein the plurality of tracking parameters are selected from the group comprising data integrity, tracking loop error magnitudes and variances, loop lock states, continuity of position fixes, internal RF/IF AGC values, and front-end overload indicators.

4. The method of claim 1, further comprising:
monitoring the plurality of tracking parameters for a second set of predetermined conditions;
and, when the second set of predetermined conditions are met, sending a second notifying signal and switching to the Global Positioning System fix as a primary fix.

5. The method of claim 1, further comprising:
monitoring the Global Positioning System fix and the Theater Positioning System fix;
and, if the difference between the Global Positioning System fix and the Theater Positioning System fix exceeds a predetermined threshold value, sending a second notifying signal and switching to the Theater Positioning System as a primary fix.

6. The method of claim 1, further comprising:
providing an Inertial Navigation System fix;
calibrating the Inertial Navigation System fix based on the Global Positioning System fix.

7. The method of claim 6, further comprising:
providing a precision timing signal;
using the precision timing signal to coordinate the providing of the Global Positioning System fix, the providing of the Theater Positioning System fix, and the providing of the inertial Navigation System fix.

8. The method of claim 6, further comprising:
integration processing of the providing of the Global Positioning System fix, the providing of the Theater Positioning System fix, and the providing of the Inertial Navigation System fix.

9. The method of claim 8, wherein the integration processing is selected from the group comprising triple-input Kalman filtering, Allan filtering, multidimensional kernel techniques, or combinations thereof.

10. The method of claim 6, further comprising:
providing a plurality of local position sensors;
initially calibrating the Inertial Navigation System fix using the plurality of local position sensors.

11. The method of claim 6, wherein the Theater Positioning System fix has a second plurality of tracking parameters, and further comprising:
monitoring the second plurality of tracking parameters for a second set of predetermined conditions;
and, when the second set of predetermined conditions are met, sending a second notifying signal and switching to the Inertial Navigation System fix as a primary fix.

12. The method of claim 1, further comprising:
providing a plurality of environmental constants;
adjusting the Theater Positioning fix based on the plurality of environmental constants.

13. The method of claim 1, further comprising:
performing a signal integrity test on Global Positioning System data associated with a Global Positioning System satellite in communication with the Global Positioning System receiver; and
excluding the Global Positioning System data from the Global Positioning System fix based on results of the signal integrity test.

14. The method of claim 1, further comprising:
performing a test of Global Positioning System data associated with a Global Positioning System satellite in communication with the Global Positioning System receiver for sufficiency, consistency, stability, and overall validity; and
excluding pseudorange and time data associated with the Global Positioning System satellite from the Global Positioning System fix based on results of the test.

15. The method of claim 1, further comprising:
performing a signal integrity test on Theater Positioning System data associated with a Theater Positioning System transmitter in communication with the Theater Positioning System receiver; and
excluding the Theater Positioning System data from the Theater Positioning System fix based on results of the signal integrity test.

16. A method comprising:
acquiring Global Positioning System data by a Global Positioning System receiver;
acquiring Theater Positioning System location data by a Theater Positioning System locating receiver;
acquiring Inertial Navigation System data by Inertial Navigation System electronics;
providing a precision timing signal;
performing a first signal integrity test on the Global Positioning System data;
outputting a Global Positioning System fix associated with the Global Positioning System receiver as a primary position fix in response to a determination that the Global Positioning System data passed the first signal integrity test;
performing a second signal integrity test on the Theater Positioning System location data in response to a determination that the Global Positioning System data failed the first signal integrity test;
outputting a Theater Positioning System fix associated with the Theater Positioning System receiver as the primary position fix in response to a determination that the Theater Positioning System data passed the second signal integrity test;
performing a third signal integrity test, in response to a determination that the Theater Positioning System data failed the second signal integrity test, to determine whether the Global Positioning System data and the Theater Positioning System data are combinable to form a complete hybrid GPS/TPS position fix;
combining the Global Positioning System data and the Theater Positioning System data to output the hybrid GPS/TPS position fix as the primary position fix in response to a determination that the Global Positioning System data and the Theater Positioning System data passed the third signal integrity test;
performing a fourth signal integrity test on the Inertial Navigation System data in response to a determination that the Global Positioning System data and the Theater Positioning System data failed the third signal integrity test; and outputting an Inertial Navigation System fix as the primary position fix in response to a determination that the Inertial Navigation System data passed the fourth signal integrity test.

17. An apparatus comprising:

a system controller;

a timing subsystem coupled to the system controller;

a Global Positioning System receiver coupled to the system controller;

a Theater Positioning System receiver coupled to the system controller; and inertial Navigation System electronics coupled to the system controller;

where the system controller is configured to:

perform a first signal integrity test on Global Positioning System data received from the Global Positioning System receiver;

output a Global Positioning System fix associated with the Global Positioning System receiver as a primary position fix in response to a determination that the Global Positioning System data passed the first signal integrity test;

perform a second signal integrity test on Theater Positioning System location data, received from the Theater Positioning System receiver, in response to a determination that the Global Positioning System data failed the first signal integrity test;

output a Theater Positioning System fix associated with the Theater Positioning System receiver as the primary position fix in response to a determination that the Theater Positioning System data passed the second signal integrity test;

perform a third signal integrity test, in response to a determination that the Theater Positioning System data failed the second signal integrity test, to determine whether the Global Positioning System data and the Theater Positioning System data are combinable to form a complete hybrid GPS/TPS position fix;

combine the Global Positioning System data and the Theater Positioning System data to output the hybrid GPS/TPS position fix as the primary position fix in response to a determination that the Global Positioning System data and the Theater Positioning System data passed the third signal integrity test;

perform a fourth signal integrity test on Inertial Navigation System data received from the Inertial Navigation System electronics in response to a determination that the Global Positioning System data and the Theater Positioning System data failed the third signal integrity test; and output an Inertial Navigation System fix as the primary position fix in response to a determination that the Inertial Navigation System data passed the fourth signal integrity test.

* * * * *